United States Patent
Brown

(10) Patent No.: US 7,268,179 B2
(45) Date of Patent: *Sep. 11, 2007

(54) HYDROPHOBIC COATING COMPOSITIONS, ARTICLES COATED WITH SAID COMPOSITIONS, AND PROCESSES FOR MANUFACTURING SAME

(75) Inventor: James F. Brown, Clifton, VA (US)

(73) Assignee: Cytonix Corporation, Beltsville, MD (US)

( * ) Notice: Subject to any disclaimer, the term of this patent is extended or adjusted under 35 U.S.C. 154(b) by 475 days.

This patent is subject to a terminal disclaimer.

(21) Appl. No.: 10/674,565

(22) Filed: Sep. 30, 2003

(65) Prior Publication Data

US 2004/0082699 A1 Apr. 29, 2004

Related U.S. Application Data

(60) Continuation-in-part of application No. 10/272,982, filed on Oct. 17, 2002, now Pat. No. 6,767,587, which is a division of application No. 09/823,853, filed on Mar. 30, 2001, now Pat. No. 6,495,624, which is a continuation-in-part of application No. 09/593,847, filed on Jun. 14, 2000, now Pat. No. 6,447,919, which is a division of application No. 09/220,884, filed on Dec. 28, 1998, now Pat. No. 6,156,389, which is a continuation-in-part of application No. 08/795,316, filed on Feb. 3, 1997, now Pat. No. 5,853,894.

(51) Int. Cl.
| | |
|---|---|
| C08J 3/00 | (2006.01) |
| C08K 3/20 | (2006.01) |
| C08L 37/00 | (2006.01) |
| C08F 222/40 | (2006.01) |
| C09D 5/20 | (2006.01) |

(52) U.S. Cl. ..................... 524/548
(58) Field of Classification Search ............ 524/462, 524/463, 544, 545, 546, 548, 549; 525/199, 525/284; 522/156; 526/204, 206, 242, 250, 526/255, 266, 270; 427/2, 3, 372.2, 385.5, 427/393.4, 508; 428/421, 411.1; 252/182.15, 252/182.3, 183.11; 106/2, 13
See application file for complete search history.

(56) References Cited

U.S. PATENT DOCUMENTS

| | | | |
|---|---|---|---|
| 3,415,986 A | 12/1968 | Shepard | |
| 3,428,548 A | 2/1969 | Hollahan | |
| 3,462,335 A | 8/1969 | Hansen et al. | |
| 3,547,802 A | 12/1970 | Gleit et al. | |
| 3,619,403 A | 11/1971 | Gorin | |
| 3,632,400 A | 1/1972 | Bariant | |
| 3,818,074 A | 6/1974 | Ahlbrecht | |
| 3,847,652 A | 11/1974 | Fletcher et al. | |
| 3,847,657 A | 11/1974 | Rieber et al. | |
| 3,853,657 A | 12/1974 | Lawton | |
| 3,870,610 A | 3/1975 | Baird et al. | |
| 3,910,187 A | 10/1975 | Cords | |
| 4,013,532 A | 3/1977 | Cormia et al. | |
| 4,072,769 A | 2/1978 | Lidel | |
| 4,123,308 A | 10/1978 | Nowlin et al. | |
| 4,132,829 A | 1/1979 | Hudis et al. | |
| 4,137,365 A | 1/1979 | Wydeven, Jr. et al. | |
| 4,183,780 A | 1/1980 | McKenna et al. | |
| 4,188,426 A | 2/1980 | Auerbach | |
| 4,203,856 A | 5/1980 | Pardee | |
| 4,210,697 A | 7/1980 | Adiletta | |
| 4,262,035 A | 4/1981 | Jaeger et al. | |
| 4,472,480 A | 9/1984 | Olson | |
| 4,473,596 A | 9/1984 | Beerwald et al. | |
| 4,487,081 A | 12/1984 | De Vaughn et al. | |
| 4,565,717 A | 1/1986 | Hosegood | |
| 4,615,933 A | 10/1986 | Traut | |
| 4,616,642 A | 10/1986 | Martin et al. | |
| 4,666,991 A | 5/1987 | Matsui et al. | |
| 4,783,666 A | 11/1988 | Ast et al. | |
| 4,804,572 A | 2/1989 | Bodrogi | |
| 4,810,411 A | 3/1989 | Del Pesco et al. | |
| 4,836,642 A | 6/1989 | Matsumoto et al. | |
| 4,859,754 A | 8/1989 | Maekawa et al. | |
| 4,902,529 A | 2/1990 | Rebhan et al. | |
| 4,911,782 A | 3/1990 | Brown | |
| 4,938,995 A | 7/1990 | Giordano et al. | |
| 4,946,736 A | 8/1990 | Sassa | |
| 4,948,628 A | 8/1990 | Montgomery et al. | |
| 4,948,851 A | 8/1990 | Squire | |
| 4,954,256 A | 9/1990 | Degen et al. | |
| 4,966,785 A | 10/1990 | Springston | |
| 4,977,008 A | 12/1990 | Squire | |
| 4,996,076 A | 2/1991 | Nakaya et al. | |

(Continued)

OTHER PUBLICATIONS

Aldrich Chemical Company, Inc., Products Catalog (1990), p. 1563, no month.

(Continued)

Primary Examiner—Patrick Niland
(74) Attorney, Agent, or Firm—Kilyk & Bowersox, P.L.L.C.

(57) ABSTRACT

Hydrophobic coating compositions are provided as are processes to coat articles with the compositions. Extremely hydrophobic coatings are provided by the compositions. Durable, weatherable and scratch-resistant coatings are provided by compositions comprising a fluorinated component and an adhesion promoter compound. The adhesion promoter compound can include an alkoxy group, a furfuryl-containing ring structure, and a reactive group.

29 Claims, No Drawings

U.S. PATENT DOCUMENTS

| | | | |
|---|---|---|---|
| 5,006,382 | A | 4/1991 | Squire |
| 5,024,851 | A | 6/1991 | Goad et al. |
| 5,041,266 | A | 8/1991 | Fox |
| 5,051,312 | A | 9/1991 | Allmer |
| 5,159,105 | A | 10/1992 | Hansen et al. |
| 5,164,252 | A | 11/1992 | Henning et al. |
| 5,171,611 | A | 12/1992 | Porter et al. |
| 5,229,163 | A | 7/1993 | Fox |
| 5,274,159 | A | 12/1993 | Pellerite et al. |
| 5,356,668 | A | 10/1994 | Paton et al. |
| 5,368,924 | A | 11/1994 | Merrill, Jr. et al. |
| 5,378,521 | A | 1/1995 | Ogawa et al. |
| 5,398,035 | A | 3/1995 | Densmore et al. |
| 5,431,962 | A | 7/1995 | Glass et al. |
| 5,447,689 | A | 9/1995 | Gibboni et al. |
| 5,474,796 | A | 12/1995 | Brennan |
| 5,482,768 | A | 1/1996 | Kawasato et al. |
| 5,536,775 | A | 7/1996 | Curatolo et al. |
| 5,545,255 | A | 8/1996 | Ogawa |
| 5,620,807 | A | 4/1997 | Mussell et al. |
| 5,672,384 | A | 9/1997 | Kanngard et al. |
| 5,686,549 | A | 11/1997 | Grainger et al. |
| 5,706,804 | A | 1/1998 | Baumann et al. |
| 5,853,894 | A * | 12/1998 | Brown ........................ 428/422 |
| 5,910,372 | A | 6/1999 | Griffin et al. |
| 5,928,792 | A | 7/1999 | Moya |
| 5,932,299 | A | 8/1999 | Katoot |
| 5,998,549 | A | 12/1999 | Milbourn et al. |
| 6,495,624 | B1 * | 12/2002 | Brown ........................ 524/462 |

OTHER PUBLICATIONS

Boenig. "*Plasma Science and Technology*" Cornell University Press, pp. 202-203 (1982), no month.

Bohnert et al., "Plasma gas discharge deposited fluorocarbon polymers . . . ", *J. Biomater Sci. Polymer Edn.*, vol. 1, No. 4, pp. 279-297 (1990), no month.

Continental Laboratory Products Incorporated, Products Catalog (1996), pp. 2, 3, 8, and 9, no month.

Continental Laboratory Products Incorporated, Products Catalog (1995), pp. 1, 2, 4, and 7, no month.

Denville Scientific Inc., Research Products Catalog 1991, (1991), pp. 1-32, no month.

Enprotech, 1990 Electrophoresis Catalog Addendum (1990), 4 pages, no month.

Gould, "Contact Angle. Wettability. and Adhesion," *Advances in Chemistry Series*, No. 43, American Chemical Society (1964), pp. 16-23, no month.

PGC Scientifics, Spring/Summer 1993 Products Catalog, (1993), pp. 11, 88, and 123, no month.

"Radar Desensitization in Rain. Water Films On . . . ", *Honeywell Technical Newsletter*, Nov. 2, 1998, 5 pgs.

Sartomer Company, Inc., Product Detail, Alkoxylated Tetrahydrofurfuryl Acrylate, Web Page, Printed Aug. 4, 2003.

Ulster Scientific, Inc., Product Brochure and Price List for FluoroPel™ Pipette Tips (1991), no month.

USA/Scientific Plastics, Catalog No. 12, p. A16 (Pipet tips) (1992), no month.

3M Commercial Chemicals Division, Product Brochure for "*Fluorad® Surface Modifier FC-723*", Jun. 1983; 4 pages.

3M Industrial Chemical Products Division, Product Brochure for "*Fluorad™ Fluorochemical Coating FC-721*", Feb. 1988, 3 pages.

3M Industrial Chemical Products Division, Product Brochure, "*Fluorad™ Fluorochemical Surfactant FC-740*" Apr. 1987, 4 pages.

3M Industrial Chemical Products Division, Product Brochure, "*1993 Fluorinert Liquids*", (1993), 4 pages, no month.

* cited by examiner

HYDROPHOBIC COATING COMPOSITIONS, ARTICLES COATED WITH SAID COMPOSITIONS, AND PROCESSES FOR MANUFACTURING SAME

CROSS-REFERENCE TO RELATED APPLICATION

The present application is a continuation-in-part of U.S. patent application Ser. No. 10/272,982, filed Oct. 17, 2002 now U.S. Pat. No. 6,767,587, which in turn is a divisional of prior application Ser. No. 09/823,853, filed Mar. 30, 2001, now U.S. Pat. No. 6,495,624, issued Dec. 17, 2002, which in turn is a continuation-in-part of prior application Ser. No. 09/593,847, filed Jun. 14, 2000, now U.S. Pat. No. 6,447,919, issued Sep. 10, 2002, which in turn is a divisional of prior application Ser. No. 09/220,884, filed Dec. 28, 1998, now U.S. Pat. No. 6,156,389, issued Dec. 5, 2000, which in turn is a continuation-in-part of prior application Ser. No. 08/795,316, filed Feb. 3, 1997, now U.S. Pat. No. 5,853,894, issued Dec. 29, 1998.

FIELD OF THE INVENTION

The present invention relates to compositions for coating surfaces, surfaces coated with compositions, and methods of forming coated surfaces. More particularly, the present invention relates to hydrophobic coatings for laboratory vessels and other articles. The present invention also relates to processes for forming a hydrophobic coating on a surface of an article.

BACKGROUND OF THE INVENTION

Hydrophobic coatings are useful for many applications, for example, to prevent rain from wetting-out or collecting on a windshield. Another application of hydrophobic coatings is in the field of laboratory vessels. Laboratory vessels including chambers, microtiter plates, vials, flasks, test tubes, syringes, microcentrifuge tubes, pipette tips, selectively coated microscope slides, coverslips, films, porous substrates and assemblies comprising such devices are often used to handle, measure, react, incubate, contain, store, restrain, isolate and/or transport very precise and sometimes minute volumes of liquid, often biological samples. When samples are quantitatively analyzed, it can be of critical importance that precise and representative amounts of sample are transferred, or else inaccurate results are obtained. Due to the different affinities of some materials to adhere to the walls of a laboratory vessel, qualitative analyses such as concentrations of materials may also be adversely affected if certain materials in a sample selectively adhere to operational surfaces of the vessel walls.

Unfortunately, materials typically used in the manufacture of laboratory vessels do not sufficiently repel many biological sample fluids nor do they sufficiently resist the adherence of molecular constituents of such a sample fluid. The sample fluids often wet the surface of the vessel causing residual quantities of liquid sample to cling to an operational surface of the vessel when the sample is removed. In some cases, significant quantitative and/or qualitative errors result. It is therefore desirable to provide extremely hydrophobic coatings for laboratory vessels which will reduce the wetting of the operational surfaces of the vessels and reduce clinging by even the most adherent samples so that virtually no sample remains in the vessel when poured, ejected or vacuumed therefrom.

In some laboratory techniques, it is important to restrain, isolate or limit the position of liquid samples to prescribed locations within or on a laboratory vessel, while keeping adjacent surfaces of the vessel substantially free of liquid sample. Such techniques can be used to facilitate chemical and biological reactions, as well as improving sample recovery. The prescribed locations may (1) have surfaces that are reactive, (2) have a surface that exhibits a specific affinity, (3) optimize the sample volume to area ratio, (4) restrict sample movement during at least some vessel motion, and (5) have porous surfaces.

Vessels for handling, measuring, storing and transporting liquids have previously been rendered less wettable and less adherent to fluids by application of silicone compounds to the vessel surfaces which come in contact with the fluid. For example, silane monomers and polymers have been added to polyolefins prior to injection molding, resulting in laboratory vessels with an improved repellency to many sample fluids and their constituents. These materials produce surfaces with surface energies potentially as low as 22 ergs per square centimeter. In practice, however, silane treated vessels exhibit surface energies that measure 25 to 30 dynes/cm.

Drawbacks associated with silane treatments include a continued wetting of the vessel, adherence to the vessel walls by many samples, chemical reactivity with many reagents, and a tendency for the vessel to become wettable following the common practice of autoclaving for sterilization. Silicones are known to freely migrate, leading to worries over sample integrity. Many pipette tips are plugged with porous filters to prevent sample contamination from the pipettor barrel, yet these free silicones make the pipette tips slippery and cause the filters to become loose or dislodged. Additionally, silicones must typically be added at a level of 2 percent by weight to be effective, making the cost prohibitive for many price sensitive applications.

Fluorination processes have been used to treat laboratory vessels and have resulted in vessels having interior surfaces with surface energies approaching 22 dynes/cm. These processes generally involve the full or partial replacement of superficial hydrogen by fluorine using chemical processes or the plasma polymerization of fluorine containing gases. U.S. Pat. No. 4,902,529 to Rebhan et al. discloses a plasma torch process using $CF_4$ or $SiF_6$ to fluorinate the interior of resin articles and containers in an attempt to eliminate the use of dangerous mixtures of fluorine and inert gases. This method is impractical, however, for treating the vast quantities of small vessels consumed by industrial, clinical and research establishments. Furthermore, improvements in performance over silicone processes are only marginal.

The plasma polymerization of perfluorobutene onto the exterior surface of various articles has been reported to produce exterior surfaces with up to 24 percent $—CF_3$ groups, and a high percentage of $—CF_2—$ groups. Resultant surface energies of 22 to 24 dynes/cm are obtained due to the presence of cross-linkages and numerous monofluorinated carbons. Time-consuming, carefully controlled RF plasmas employing fluorine-containing monomers have also been used to reduce the wettability and adhesion of laboratory vessels, producing exterior surfaces energies of 12 to 15 dynes/cm and surface populations of up to about 25% by area $CF_3$ groups on exterior non-operational surfaces. Interior operational surfaces, however, are still not reduced to below 22 dynes/cm. While these methods offer improvements over silicon-based treatments, the time, expense and equipment required are not appropriate for high commercial volume articles that are often for one-time use and require very low inherent cost.

Perfluoroalkyl polymers and carefully prepared monolayer films of perfluoroalkyl surfactants are widely recognized as having surface energies below 20 dynes/cm. FEP and PFA Teflons®, available from DuPont's Polymer Products Department, Wilmington, Del., have surface energies of 15 to 16 dynes/cm with —$CF_3$ populations as high as 25 percent. Extruded and fused Teflon® vessels are currently manufactured for special applications involving exceptionally harsh reagents but are expected to have a long service life because of their high material cost when compared to the cost of glass or polypropylene vessels.

Fluoroalkyl polymers have been used to produce oleophobic, hydrophobic membrane surfaces that are not wetted by common organic solvents. Membranes coated with such polymers are disclosed in U.S. Pat. No. 4,954,256 to Degen et al. These membranes have surface energies ranging from about 6 to about 15 dynes/cm but require a manufacturing procedure which involves soaking a membrane with a solution containing polymerizable monomers, exposing the solution-wetted membrane to high doses of ionizing radiation, and then washing the ionized membrane with organic solvent to remove unreacted monomer. While no attempts are known to coat laboratory vessels by such a procedure, it is expected that difficulties would arise as well as high cost in coating such vessels because of the shear bulk of the polymerizable solution to be irradiated and problems with fully washing the coated vessel.

Methods of making disposable, one-time use laboratory vessels such as pipette tips can involve a substantial loss of costly solvent when a coating solution is used to form a hydrophobic coating. A need exists for a process of coating laboratory vessels at a cost of a few cents per thousand with an insignificant loss of solvent.

Recent patents may suggest the practice of solvent recovery in the application of certain branched fluoropolymers, such as Teflon AF, to articles of manufacture. U.S. Pat. No. 5,356,668 to Paton et al. and U.S. Pat. No. 5,006,382 to Squire are incorporated herein in their entireties by reference. The mere suggestion of such a recovery practice, however, does not provide a commercially viable method for coating many low cost, one-time-use articles, such as pipette tips and laboratory vessels.

Environmental concerns about pollution by volatile solvents, especially chlorine-containing materials such as perchloroethylene, have motivated significant improvement in dry cleaning equipment, resulting in significant reductions in solvent losses. Cleaning and coating equipment used in the semiconductor, plastics, and metal parts industries have made similar strides. Better seals and welded ducts account for some of the upgrades.

Operation of these machines according to their suggested protocols using fluorinated solvents, however, still results in large, expensive losses. For example, the Renzacci Company of Italy manufactures perchloroethylene-based cleaning machines that are widely recognized to be among the best in the industry in terms of minimal solvent loss. But loaded with 60,000 pipette tips in mono-filament mesh bags and using Renzacci's standard automated programs, these machines loose about 5 pounds of FC84 (3M Company, St Paul, Minn.) per cycle. This translates to solvent consumption costs of over one dollar per thousand tips. Higher boiling point fluorocarbon solvents have lower loss rates, but the solvent expense is about the same due to their higher cost per pound.

The Renzacci standard automated program partially fills a cleaning/coating tank of approximately one-half cubic meter with solvent at ambient temperature from a solvent reservoir. Articles in the tank are then tumbled in the solvent for several minutes, followed by drain, spin and spin-rinse cycles. With continued tumbling, a heat pump and a supplementary heat source (electric, steam, etc.) heat air blown through the tank, while passing air returns from the tank over chilled condensation coils where solvent vapor is liquefied and returned to the reservoir. Water is circulated through the heat pump system to remove excess heat. However, the temperature in the tank can still rise to over 50° C. and the reservoir temperature can rise to more than 30° C. At the end of the process cycle, heating is discontinued and the tank and reservoir are cooled to about 30° C. When the tank door is opened to remove the cleaned/coated articles, a small blower draws air out of the tank through a carbon filter in order to reduce the odor of remaining perchloroethylene solvent.

Unfortunately, at 30° C. the solvent FC84 has a vapor pressure of over one fifth atmosphere, and the half cubic meter tank volume contains about two pounds of solvent as dense vapor (about 14 times that of air), even without agitation. Opening the tank door results in the immediate loss of this material, at a current cost of about $45 (US). Since the machine will handle about 60,000 tips per run, the loss per thousand is about 50 cents. The carbon recovery filter is at the top of the tank and is of little practical economic value.

Additional losses accrue during the heat cycle at 50° C. when the machine fittings and seals are challenged by pressures approaching 1.2 atmospheres. Furthermore, it is apparent from other studies that low molecular weight fluorocarbon solvents, having boiling points between 80° and 120° C. are particularly "slippery" in passing through rubber and silicone gaskets and seals. No machines investigated had more aggressive containment systems for leak-free operation under these conditions.

A need exists for a method of coating large numbers of laboratory vessels which results in a very low loss of solvent at a surprising and significant cost savings.

Described by Dettre and Johnson in 1964 are phenomena related to rough hydrophobic surfaces. Dettre and Johnson developed a theoretical model based on experiments with glass beads coated with paraffin or TFE telomer. For even moderately hydrophobic surfaces (e.g. about 40 dynes/cm or less) with high levels of microscopic roughness, where the average height of bumps is close to or exceeds their average width, an aqueous liquid, especially one without surfactant activity, in contact with the surface only wets the top of the bumps, forming what is known as a "composite" air-liquid-solid interface. For example, water at rest on a surface of this kind may exhibit contact angles greater than 160 degrees. This unusual property has been practiced and is the basis for a variety of proprietary microscope slide, plate and membrane products using coatings sold by Cytonix Corporation, in Beltsville, Md. However, such products are based on Teflon® and the hydrophobic properties of difluoromethylene (—$CF_2$—) groups, which at best exhibit surface energies of from about 18 to about 20 dynes/cm.

Hydrophobic coatings are also used on antennas and radomes. Microwave signals are significantly, and in some cases about equally, attenuated by atmospheric precipitation and by water films on antennas and radomes. Higher microwave frequencies have resulted in greater communication bandwidth, but the shorter wavelengths are even more susceptible to rain attenuation. Airports report losses of vital satellite links during heavy precipitation, and most home viewers of satellite TV are familiar with programming disruption during even light rain. As bandwidths expand commercial and private use of microwave links, the problem of rain attenuation will become even more critical.

Numerous companies have addressed the problem of water filming on microwave radomes and dishes by using hydrophobic coatings to shed water as small, microwave-transparent beads. The smooth silicones and fluoropolymer coatings allow formation of large beads that can form rivulets and films during moderate to heavy rain. As these coatings degrade over time due to sunlight and pollution, they become less hydrophobic and their effectiveness is diminished.

Several companies, notably Vellox (Salisbury, Mass.) and Boyd (Hudson, Mass.), have addressed the problem of rain fade using hydrophobic coatings that comprise micropowders of Teflon® or fumed silica dispersed in a hardenable resin, such as an alkyd or diisocyanate. These composite coatings have good performance initially but begin to form water films in an hour or less of moderate to heavy rain. After months or just weeks of exposure to mid-latitude summer sunlight these types of coatings wet out even more quickly. Herein, mid-latitude summer sunlight is defined as average mid-day uv radiation during the summer months in regions of the United States from a latitude of 25° to a latitude of 40°, and moderate to heavy rain is defined as 1 to 6 inches per hour. Drying fully after being swamped, the Boyd Teflon® dispersion coating CRC6040 recovers most of its previous performance, but the hydrophobic performance of the Vellox LC-410 fumed silicate coating is permanently lost. Both coatings must be reapplied every year or two.

It is believed that sunlight damages at least the surfaces of all solid polymers to some degree. Generally, unsaturated materials degrade faster than aliphatics, and aliphatics degrade faster than some fluoropolymers. But all hydrocarbon resins suffer at least superficial changes that render them more wettable; and this is also true for most fluoropolymers. The fluoropolymer exceptions are those that degrade to hydrophobic by-products, such as PTFE; but even the exceptions can be rendered somewhat more hydrophilic and receptive to adhesives by ionizing radiation treatment. Once surface damage has taken place, the new surface is a permanent feature of the solid. Tests of all common fluorinated and non-fluorinated plastics show increases in surface wettability after exposure to the equivalent of months in mid-latitude summer sunlight.

A need exists for a method of manufacturing a coating which exhibits, on all or part of an operational surface thereof, interfacial contact angles to aqueous samples of 120° and above, even as high as 160°, and surface energies well below 20 dynes/cm. According to some desirable applications, a need also exists for vessels having surface energies of below 10 dynes/cm. This need is especially acute but difficult to achieve for one-time-use vessels costing only a few dollars per thousand.

There is also a need for extremely hydrophobic coatings that are durable, for example, coatings for articles such as windshields, rainshields, and satellite and/or radar dishes, other signal receivers and transmitters, and radomes. A need exists for a composition which can provide an extremely hydrophobic and durable coating on a surface of an article. Problems associated with water film formation on radomes, and problems of radar desensitization in rain are described, for example, in the Honeywell Technical Newsletter entitled *RADAR DENSENSITIZATION IN RAIN, WATER FILMS ON RADOMES, AND HYDROPHOBIC COATINGS*, Nov. 2, 1998, re-published by Cytonix Corporation with permission from Honeywell, Inc., said newsletter being incorporated herein in its entirety by reference. A need exists for a coating composition for a signal transmitter or receiver, wherein the composition can be applied and form an extremely hydrophobic coating that does not interfere with signal transmission or reception.

A need also exists for a composition that forms a hydrophobic surface useful as a surface for articles which could benefit from hydrophobic properties, for example, radomes and antennas, vehicular surfaces, architectural surfaces, outdoor furniture, household goods, and kitchen and bath articles.

SUMMARY OF THE INVENTION

According to the present invention, extremely hydrophobic coatings are provided. According to an embodiment of the present invention, the invention provides a durable, weatherable, and erosion-resistant hydrophobic coating. The coatings of the present invention can be used on a signal transmitter or receiver, for example, a microwave, infra-red, light, radar, electromagnetic, or the like emitter or receiver such as a radome. The coatings of the invention do not adversely affect reception or transmission of a signal.

According to various embodiments, a composition is provided that includes at least one adhesion promoter compound, for example, a compound including an alkoxy moiety, a carbon- and oxygen-containing non-aromatic ring structure, and a reactive group. The composition also includes at least one fluorinated component having from about one to about 100 carbon atoms. The carbon- and oxygen-containing non-aromatic ring structure can be, for example, a furfuryl-containing or a pyran-containing ring structure.

According to another embodiment of the present invention, a process is provided for forming an extremely hydrophobic coating on a surface of an article. An embodiment of the present invention is based on the discovery that methods can be provided to coat laboratory vessels with an extremely hydrophobic coating at a cost of only a few cents per thousand vessels.

According to embodiments of the present invention, a surface is coated with a composition which includes or provides a reaction product, for example, a polymerization product, of a fluorinated reactant, for example, a fluorinated monomer containing from about 3 to about 20 carbon atoms and at least one terminal trifluoromethyl group. According to embodiments of the invention, the coating composition also includes a hardenable material, for example, a urethane resin or TEFLON AF from DuPont. Hardenable materials that may be employed include non-fluorinated hardenable resins, fluorinated hardenable resins, and perfluorinated hardenable resins. The resulting surfaces are extremely hydrophobic and highly resistant to removal by weathering and/or solvents.

Herein, the term "fluorinated" includes both perfluorinated and non-perfluorinated monomers and/or polymers. The present invention relates to fluorinated compositions, coatings, and coated surfaces which may be part of or parts of laboratory vessels, signal transmitters, signal receivers, signal reflectors, radomes, vehicular surfaces, architectural surfaces, outdoor furniture, household goods, kitchen articles, kitchen surfaces, bathroom articles, bathroom surfaces, antennae, microwave antennae, dishes, reflectors, signs, visual signaling devices, scanner windows, lenses, liquid crystal displays, and video displays. In addition, the present invention relates to processes of coating small article surfaces, for example, laboratory vessels, with nominal solvent loss.

Processes of forming the extremely hydrophobic coatings of the present invention may include applying a solution, suspension or other liquid containing a coating composition and allowing the solution, suspension or other liquid to harden, dry and/or cure on a surface. The coating composition includes a trifluoromethylated agent, which may be a reactant, a monomer, a reaction product, and/or a polymerization product. The present invention also provides a method wherein a solution or suspension of such agent is partially, selectively or conformally coated onto at least a portion of a surface of an article, for example, a laboratory vessel, a radar dish, a radome, a windshield, a rainshield, a vehicular surface, an architectural surface, outdoor furniture, a household good, a kitchen article, a kitchen surface, a bath article, a bathroom surface, an antenna, a microwave antenna, a dish, a reflector, a sign, a visual signaling device, a scanner window, a lens, a liquid crystal display, and/or a video display. Then, the composition including the agent is subsequently hardened, dried, and/or cured to remove solvent and/or suspension medium. The coatings provide surfaces exhibiting extremely low surface energies and, for some cases, preferably also provide a high resistance to solvent removal. Some compositions according to the present invention may desirably be removed with one or more organic solvent, for example, with methylethylketone (MEK).

A surprising discovery about the economics and commercial success of coating low cost, especially one-time-use, articles with fluoropolymer coatings is that process efficiency in recovering carrier solvents can be a more important factor than the relatively high cost of the coating fluoropolymers. While high quality unsaturated fluoromonomers currently can cost $250 (US) to over $1000 (US) per pound in bulk quantities, articles such as pipette tips may only require 10 to 20 milligrams of fluoropolymer per thousand pipette tips at a current cost of less than 10 cents per thousand. Conventional coating/washing equipment, for example, equipment from Renzacci of America Inc., Absecond, N.J., and from Fluoromatic Ltd., Villa Park, Ill., and processes that are designed to recover solvents, can consume over 25 grams of solvent per thousand pipette tips at a current cost of about five cents per gram or $1.25 (US) per thousand. In many situations, particularly coating methods using expensive perfluoropolymers, this is an unacceptable added cost to articles otherwise costing only a few dollars per thousand to manufacture. According to the present invention, solvent loss is significantly reduced compared to the conventional machines and processes.

According to some embodiments of the invention, a hydrophobic coating may be formed from a coating composition of the invention applied or co-injected as a resin, powder, particle or mixture which is dried, melted, sintered, fused cured or otherwise formed on a surface of an article.

Moreover, the present invention is based on the discovery that laboratory vessel surfaces of low surface energy can be provided by coating a solution, suspension, other liquid, resin, powder, particle or mixture of a trifluoromethylated agent according to the invention, admixed with microscopic particles and/or fibers. In some embodiments, foaming and/or pore-forming agents may additionally, or alternatively, be admixed with the coating compositions of the present invention. The trifluoromethylated agent may include a trifluoromethylated reactant, monomer, reaction product and/or polymerization product. Upon subsequent drying, melting, solidifying, sintering, fusing or curing of the coating formulation, a laboratory vessel is produced exhibiting extraordinarily high contact angles to aqueous liquids.

The present invention is also based on the discovery that coatings of trifluoromethylated agents containing 3 to 20 carbon atoms and at least one terminal trifluoromethyl group are extremely hydrophobic and can provide populations of 30% by area or greater of trifluoromethyl groups on exposed coating surfaces. According to the present invention, a reaction product of a reactant trifluoromethylated agent may be coated from a formulation onto at least a portion of an operational surface of a laboratory vessel, for example, a vessel surface which contacts or restrains a liquid sample. The coatings have tightly packed, exposed trifluoromethyl groups.

According to some embodiments, at least about 30% of the area of the exposed coating surface is covered by trifluoromethyl groups. According to more preferred methods of the invention, the exposed coating surface is covered with a population of trifluoromethyl groups of from about 50% to 100% by area of the surface. According to some embodiments, at least about 15% by area of the exposed coating surface is covered by trifluoromethyl groups and the coating includes a hardenable resin in addition to a reaction product of a trifluoromethylated agent.

According to the present invention, the coating composition comprises a trifluoromethylated agent comprised of a fluorocarbon, hydrofluorocarbon, epoxy, urethane, silicone, acrylic or other material that has a terminal trifluoromethyl group and contains from about 3 to about 20 carbon atoms. Preferably, coatings made from such compositions exhibit tightly packed trifluoromethyl groups on the exposed coating surface. According to some embodiments of the invention, coating polymers made from substantially non-branched fluorinated monomers having carbon chains of from about 3 to about 20 carbon atoms in length, and more particularly from about 6 to about 12 carbon atoms in length, enable a dense packing of the terminal trifluoromethyl groups and thus can form hydrophobic surfaces of very low surface energy, having critical surface tensions of about 10 dynes/cm or lower at 200° C., and having high resistance to solvent removal and low retention of biological samples.

According to yet other embodiments of the invention, laboratory vessels and other articles are coated with hydrophobic coating formulations containing terminal trifluoromethyl groups and optionally further containing reaction products, polymers, reactants, polymerizable monomers and/or other additives which also become incorporated in the hydrophobic coatings.

DETAILED DESCRIPTION OF THE INVENTION

According to various embodiments, an extremely hydrophobic coating can be formed on the surface of an article from a composition containing at least one adhesion promoter compound, for example, a compound including an alkoxy moiety, a carbon- and oxygen-containing non-aromatic ring structure, and a reactive group. According to various embodiments, the composition also includes at least one fluorinated component having from about one to about 100 carbon atoms. According to various embodiments, the oxygen-containing non-aromatic ring structure can be, for example, a furfuryl-containing ring structure, or a pyran-containing ring structure. Particular articles which can be coated according to the present invention include those having an operational surface comprising plastic, sintered material, woven material, textured material, semiconductor, glass, ceramic, or metal, or a primed or pre-coated surface. The invention can also be used on operational surfaces which are porous, smooth, rough, pitted, foamed, grooved, cross-hatched, striated, or having patterned physical features.

Laboratory vessels according to an embodiment of the present invention have at least one operational surface. Many vessels according to the invention have at least one interior wall which defines a reservoir portion for containing a volume of liquid, and at least one opening in communication with the reservoir portion. According to some embodiments of the invention, a laboratory vessel having an interior wall and an opening is coated on the interior wall and on the area surrounding and forming the opening, with a polymer coating according to the invention.

According to embodiments of the present invention, methods are provided for forming extremely hydrophobic coatings on small articles such as laboratory vessels. Measures to curtail fluorinated solvent losses, according to the present invention, focus on better containment, improved solvent recovery, and reduced solvent vapor pressure throughout the coating operation. According to embodiments of the invention, the general design of the Renzacci Patriot 350, from Renzacci of America, may be employed for the coating machine and process of the present invention, but with some major modifications. According to the present invention, it has been determined that rubber and silicone seals are significantly not leak-proof to fluorocarbon solvents. According to the present invention, sealing means comprising a rubber derived from vinylidene fluoride and hexafluoropropene, for example, VITON™ seals are substituted for other rubber or silicone seals. The generally lower permeability of VITON™ seals to hydrophobic gases such as methane and tetrafluoromethane prevent a significant amount of fluorocarbon solvent and/or gas loss as a result of a coating process.

Metal tubing and swaged fittings are preferred over plastic piping and threaded pipe connections. If the Renzacci machine is modified to form an apparatus according to the present invention, the carbon "recovery" system of the Renzacci model is preferably eliminated.

According to embodiments of the present invention, solvent recovery is enhanced by lowering the cooling coil temperature and by slowing the air flow over the coils. Longer recovery times are programmed to further improve solvent recovery according to embodiments of the present invention. According to embodiments of the invention, significant benefits in reducing solvent loss are achieved by operating the entire coating cycle at temperatures that keep solvent vapor pressure low relative to atmospheric pressure, that is, at about or below atmospheric pressure. Although removing solvent from wetted articles according to the invention requires somewhat more time, the increased cost of machine time is only hundredths of a cent per thousand pipette tips. Solvent consumption, however, is reduced to only barely detectable levels, providing overall savings of more than $60 (US) per cycle.

According to embodiments of the present invention, a process is provided wherein laboratory vessels can be coated with a composition which forms a coating having at least a 15% by area trifluoromethyl surface, and solvent loss resulting from the process of less than 20 grams of fluorosolvent lost per pound of processed laboratory vessels. More preferably, solvent loss resulting from the process is less than 10 grams of fluorosolvent lost, more preferably less than 5 grams of fluorosolvent lost, per pound of processed laboratory vessels. Even more preferably, fluorosolvent loss according to an embodiment of the present invention is only one gram of fluorosolvent lost per one pound of processed laboratory vessels.

According to embodiments of the present invention, a process is provided wherein articles, for example, laboratory vessels, can be coated with a composition which forms a coating having at least a 15% by area trifluoromethyl surface, and solvent vapor pressure within the coating chamber is maintained substantially below atmospheric pressure. Preferably, solvent vapor pressure within the coating chamber is maintained at below about 25% of atmospheric pressure, more preferably, at below about 10% of atmospheric pressure, for example, below about 5% of atmospheric pressure. Even more preferably, solvent vapor pressure is maintained at less than 1% of atmospheric pressure. Temperature control can be used to maintain low pressure. The solvent loss is substantially minimized according to the process of the present invention wherein after coating the articles the seal of the sealed chamber is broken while the vapor pressure within the chamber is below atmospheric pressure, preferably below about 25% of atmospheric pressure.

According to the present invention, laboratory vessels are provided with coatings having at least a 15% surface area population of trifluoromethyl groups by a process wherein solvent temperature is maintained substantially below its boiling point during the coating and solvent recovery process. Preferably, a fluorinated solvent is used. Preferably, solvent temperature is maintained below 75%, for example, below 50% of the absolute value of the difference between the boiling point of the solvent and 25° C. For example, if the solvent has a boiling point of 85° C., the temperature is preferably maintained at or below 70° C., which is at or below 75% of the absolute difference between 85° C. and 25° C. More preferably, solvent temperature is maintained below 25% of the absolute value of the difference between the boiling point of the solvent and 25° C. Cooling water chillers or heat exchangers can be used, for example, to lower the temperature of the coating solution or suspension.

Articles such as laboratory vessels to be coated according to a process of the present invention may contain or consist of plastic, metal, or glass. Preferred materials used to manufacture the coated laboratory vessels of the present invention include polypropylene, polyethylene, polyethyleneterephthalate, polystyrene, polycarbonate and cellulosics. More expensive plastics such as polytetra-fluoroethylene and other fluorinated polymers may be used. Some vessels made from these plastics are hydrophobic without any additional coating. Herein, the term "hydrophobic" refers to a surface exhibiting an average surface energy of about 40 dynes/cm or less. Because polypropylene is inexpensive and quite hydrophobic itself, it is a particularly preferred material for laboratory vessels, including pipette tips, used for handling and transporting minute and precise amounts of biological sample.

In addition to the materials mentioned above, examples of other suitable materials for the laboratory vessels of the present invention include polyolefins, polyamides, polyesters, silicones, polyurethanes, epoxies, acrylics, polyacrylates, polyesters, polysulfones, polymethacrylates, polycarbonate, PEEK, polyimide, polystyrene, and fluoropolymers such as PTFE Teflon®, FEP Teflon®, Tefzel®, poly(vinylidene fluoride), PVDF, and perfluoroalkoxy resins. Glass products including silica glass are also used to manufacture laboratory vessels. One exemplary glass product is PYREX® (available from Corning Glass, Corning, N.Y.).

Ceramic or oxide surfaces can be coated according to embodiments of the invention. Cellulosic products such as paper and reinforced paper containers can be coated to form coated laboratory vessels according to the invention. Metal surfaces can be coated according to the invention, as can surfaces of glass, silicon, silicon compounds or ceramics that have or have not been primed with silane containing materials or other adhesion promoting materials. Primed metal, primed glass, primed ceramic and primed oxide surfaces can be coated according to embodiments of the invention. Vessel surfaces that have been pre-coated with epoxies, silicones, urethanes, acrylics, or other materials can also be coated according to embodiments of the invention.

Although some wash-off of polymerized coating material or coating monomer might be expected after repeated usage, the coatings of the present invention do not measurably wash off most laboratory vessel surfaces. It is believed that little if any wash-off occurs because the coating solution causes softening and swelling of the vessel material, especially in uncross-linked plastics, and enables entanglement of coating and vessel substrate molecules allowing strong Van der Waals and other bonding forces which hold the prepolymerized product where applied to an operational surface of the vessel. The linear swelling of many polymers and elastomers, including some fluoroelastomers and some silicones, is reported in Table 8 of the 1996 Technical Information sheet for Vertrel® XF, available from DuPont's Polymer Products Division, Wilmington, Del. Little if any wash-off occurs from other vessel materials because of the extremely low solubility of the coatings of the present invention in most solvents and limited solubility in fluorinated solvents. Preferably, even exposure to water wash conditions of 1500 psi causes no substantial reduction in hydrophobic properties of the coating or material having a surface of the present invention.

According to some embodiments of the present invention, hydrophobic reaction products having terminal trifluoromethyl groups are coated from a fluorinated agent/fluorosolvent solution or suspension onto linear, hydrophobic, essentially uncrosslinked polymers such as polyolefins and TEFLON®, and show particular resistance to removal even by chlorinated solvents. According to the present invention, swelling of the polyolefin surface during application of the fluorinated agent solution or suspension and subsequent entanglement of the reaction product, for example, polymerization product, at the interface, result in strong hydrophobic bonds between the coating and the polyolefin surface. Surprisingly, the coatings according to embodiments of the invention are not measurably removed, even with chloroform or chloroethene.

According to some embodiments of the invention, the laboratory vessel comprises a microscope slide or other substantially flat device having an operational surface at least partially coated with a coating formulation according to the invention. According to some embodiments of the invention, a delineated area of a laboratory vessel surface, for example, a portion of the surface of a microscope slide, is not coated with the coating formulation, but is instead surrounded by the coating. The coating thus forms a boundary to restrain, contain or isolate a fluid sample on the non-coated area of the surface, while adjacent surfaces remain free of liquid sample, thus isolating and facilitating chemical and biological reactions as well as improving sample recovery. The uncoated locations may have surfaces that, for example, are reactive or have specific affinities, optimize the sample volume to area ratio, or restrict sample movement during some vessel motion. The uncoated region may be surrounded by a hydrophobic coating material according to the invention which comprises microparticles and the reaction product, for example, the polymerization product, of a trifluoromethyl-containing reactant, for example, a trifluoromethyl-containing monomer.

According to some embodiments of the invention, the operational surface of a vessel such as a microscope slide is partially coated with a hydrophobic coating formulation according to the invention and partially coated with nonfluorinated material in delineated regions to isolate or constrain the position of a liquid sample to prescribed locations that do not contain the hydrophobic coating formulation.

According to embodiments of the invention, an operational surface comprises a sample retaining barrier of a rough surface composite coating according to the invention. The barrier may isolate and restrain an aqueous sample. Surrounding the composite coating may be a smooth coating material which does not contain a sufficient amount of microparticles and does not exhibit surface roughness. The surrounding smooth coating permits the run-off of non-aqueous liquids therefrom, such as organic solvents, for example, acetone or xylene.

According to some embodiments, a laboratory vessel is provided with a low surface energy coating of the present invention and further comprises a second coating. The second coating comprises the reaction product, for example, the polymerization product, of a second fluorinated reactant, for example, a fluorinated monomer. The second fluorinated reactant preferably has from about 3 to about 20 carbon atoms, at least one terminal trifluoromethyl group, and is combined with a surface roughening agent, for example, a micropowder which provides the second coating with a rough surface. The second coating has an exposed surface area populated with 30% by area or more trifluoromethyl groups and a surface energy of about 22 dynes/cm or less at 20° C. The second coating forms a continuous sample retaining barrier for retaining an aqueous sample within the barrier, and the low surface energy coating is substantially free of surface roughness and surrounds the second coating.

Articles other than laboratory vessels can also be coated with two different coating compositions according to embodiments of the present invention. According to some embodiments of the present invention, an article is coated with a first composition and then with a second, different, composition. At least one of the coatings, for example, the first coating, preferably comprises the polymerization product of at least one fluorinated monomer. At least one of the coatings can comprise the polymerization product of tetrafluoroethylene. At least one of the coatings can comprise the polymerization product of perfluoro-2,2-dimethyl-1,3-dioxole (PDD). At least one of the coatings can comprise the polymerization product of tetrafluoroethylene and PDD. Preferably, both coatings provide a trifluoromethyl group surface area population of about 15% by area or greater, more preferably, of about 30% by area or greater.

According to embodiments of the invention, regions on a surface of a laboratory vessel such as a microscope slide are used to isolate or constrain aqueous sample, and the regions are defined by a first coating comprising microscopic particles and the reaction product of a trifluoromethyl-containing reactant. The first coating may surround a portion of a surface coated with a second coating wherein the second coating comprises the reaction product of a trifluoromethyl-containing reactant. The microparticle-containing coating provides a greater hydrophobicity to aqueous liquids and thus a greater water repelling nature than the region coated with the polymerization product coating that does not contain the microparticles.

In some embodiments of the present invention, microscopic fibers such as cellulose or glass microfibers may be used with or in place of microparticles to provide surface roughness and preferably contact angles to water of about 150° and greater. Preferably, cellulose and/or glass microfibers are used which have average diameters of from about one to about 20 microns and lengths from about 20 to several hundred microns. The microfibers can be admixed to increase the mechanical strength of the coating.

According to embodiments of the invention, rough hydrophobic surfaces having a high repellency to water may be produced by employing foaming and/or pore-forming agents in the compositions and processes of the invention. Foaming and pore-forming agents that may be used include spirocarbonates, diazo compounds, compressed gases, dissolved gases, volatile liquids, and combinations thereof. The agents may be activated by heat, light, or vacuum during the drying, curing and/or hardening of the coating composition.

According to embodiments of the invention, regions on a surface of a laboratory vessel such as a microscope slide are used to isolate or constrain an organic solvent-based liquid sample, and the regions are defined by a coating comprising the reaction product of a trifluoromethyl-containing reactant, surrounding a portion of the surface coated with a formulation comprising microparticles and the reaction product of a trifluoromethyl-containing reactant. The microparticle-containing coating provides a greater affinity to organic solvent-based liquids than the region coated with the reaction product coating not containing the microparticles.

A preferred coating is provided by adhering a surface roughening agent, for example, a micropowder, to the surface of a reaction product according to the present invention, wherein the coating has an exposed surface area populated with 30% or more trifluoromethyl groups. A preferred coating can be formed with a surface roughening agent having a surface area populated with 30% by area or more trifluoromethyl groups, wherein the surface roughening agent is adhered to a hydrophobic surface. The adherence of the surface roughening agent to the surface may be due to one or more mechanisms including, but not limited to, sintering the agent onto the surface, curing a component of the surface and/or a component of the agent, melting the surface and/or the agent, and the like, or any combination thereof. The surface roughening agent, for example, a micropowder, can be dusted onto the surface.

The present invention also provides processes of preparing surface roughening agent-containing hydrophobic surfaces. According to an embodiment of the invention, a hydrophobic coating formulation is applied to a surface of an article to form a coating having an exposed surface area populated with at least 30% by area trifluoromethyl groups. Then, fluidized hydrophobic surface roughening agent microparticles are applied and adhered to the coating to provide a rough surface having an exposed surface area populated with at least 30% by area trifluoromethyl groups. The adherence of the agent to the coating may be due to one or more mechanisms including, but not limited to, sintering the agent onto the surface, curing a component of the coating and/or a component of the agent, melting the coating and/or the agent, and the like, or any combination thereof.

According to an embodiment of the invention, a hydrophobic coating formulation is applied to a surface of an article to form a coating having an exposed surface area populated with at least 30% by area trifluoromethyl groups. Then, fluidized hydrophobic surface roughening agent microparticles having an exposed surface area populated with at least 30% by area trifluoromethyl groups are adhered to the coating to provide a surface having a population of trifluoromethyl groups of 30% by area or more. The adherence of the agent to the coating may be due to one or more mechanisms including, but not limited to, sintering the agent onto the surface, curing a component of the coating and/or a component of the agent, melting the coating and/or the agent, and the like, or any combination thereof.

According to some preferred embodiments of the invention, laboratory vessels are provided having an operational surface coated with a polymer comprising the polymerization product of trifluoromethyl-terminated, substantially unbranched and fluorinated monomers containing from 6 to 12 carbon atoms. Coatings made from such products are extremely hydrophobic, oleophobic, and highly resistant to solvent removal and biological sample retention.

A particularly preferred coating solution for forming coatings according to the invention comprises the polymerization product of a trifluoromethyl terminated, substantially unbranched perfluorooctyl monomer. Coating solutions containing at least about 50% by weight of a product of such a perfluorooctyl monomer are particularly preferred for printing applications.

The coating compositions of the present invention may be diluted with an appropriate solvent or medium to obtain a coating solids content, or a non-volatile components content, of from about 0.01% by weight to about 50% by weight, preferably from about 0.1% by weight to about 2% by weight, depending upon the application technique and desired coating properties.

According to an embodiment of the present invention, a coating composition is provided for forming an extremely hydrophobic coating surface on the surface of an article, wherein the composition includes a fluorosilane, a fluorinated acid anhydride or fluoroanhydride, and a fluorinated solvent. The fluorosilane may preferably be used in an amount of from about 0.1% by weight to about 50% by weight, for example, 2% by weight, based on the weight of the composition. The fluorosilane is preferably a fluoroalkylsilane. More preferably, the fluorosilane may include a fluoroalkyl alkoxysilane, for example, perfluorooctyl trimethoxysilane. The fluorinated acid anhydride or fluoroanhydride preferably is capable of a condensation reaction with an oxide surface to form an extremely hydrophobic surface, and preferably reacts under ambient conditions or under heat. The fluorinated acid anhydride or fluoroanhydride may comprise, for example, trifluoroacetic acid anhydride, trifluorobutyric acid anhydride, and combinations thereof, both available from Aldrich Chemicals. The fluorinated solvent preferably has a boiling point above 100° C. Preferred fluorinated solvents include FC 70 (boiling point of 215° C.), and FC 40 (boiling point 155° C.), both available from 3M.

The terminal trifluoromethyl groups of the coating polymer or monomer preferably constitutes the entire operational surface of the coating. According to preferred embodiments of the invention, the polymer coating is applied in a manner such that the exposed coating surface comprises from about 30% by area to about 100% by area trifluoromethyl ($—CF_3$) groups. In other words, of the molecules and substituent groups making up the exposed operational surface of the coating, from about 30% by area to 100% by area of the exposed surface area of the coating is made up of $—CF_3$ groups. The exposed surface of the coating exhibits an extremely low surface energy which can approach about six dynes/cm, depending upon the percentage or "population" of —$CF_3$ groups making up the exposed surface of the coating and the vessel material coated according to the invention. In more preferred embodiments of the invention, from about 50% by area to 100% by area of the exposed surface is populated with trifluoromethyl groups, and even more preferably, at least about 75% by area is populated with trifluoromethyl groups.

The hydrophobicity and solvent resistance of the operational surface coating of the invention depends on a number of factors including the material of the laboratory vessel which is coated and the amount or population of terminal trifluoromethyl groups present on the exposed surface of the coating. For example, it has been determined according to the invention that when an operational surface of a polypropylene vessel is coated with a hydrophobic polymer solution to form a coating comprising 30% by area or more trifluoromethyl-terminated, substantially unbranched perfluorinated monomer having from 6 to 12 carbon atoms, the coating exhibits a surface energy of below 20 dynes/cm with high resistance to solvent removal and low retention of biological samples.

It has also been determined according to the invention that when an operational surface of a polypropylene vessel is coated with a hydrophobic polymer solution to form a coating comprising 50% by area or more trifluoromethyl-terminated, substantially unbranched perfluorinated monomer having from 6 to 12 carbon atoms, the coating exhibits a surface energy of below 15 dynes/cm with high resistance to solvent removal and low retention of biological samples.

It has also been determined according to the invention that when an operational surface of a polypropylene vessel is coated with a hydrophobic polymer solution to form a coating comprising 80% by area or more trifluoromethyl-terminated, substantially unbranched perfluorinated monomer having from 6 to 12 carbon atoms, the coating exhibits a surface energy of about 10 dynes/cm with high resistance to solvent removal and low retention of biological samples.

It has also been determined according to the invention that when an operational surface of a polypropylene vessel is coated with a hydrophobic polymer solution to form a coating comprising 100% by area or more trifluoromethyl-terminated, substantially unbranched perfluorinated monomer having from 6 to 12 carbon atoms, the coating exhibits a surface energy of below 10 dynes/cm or lower with high resistance to solvent removal and low retention of biological samples.

The most hydrophobic properties are achieved when the coating has an exposed surface consisting entirely of trifluoromethyl (—$CF_3$) groups, that is, 100% by area, with no other substituent groups exposed at the surface.

According to some embodiments of the invention, branched fluoroalkyl monomers containing terminal trifluoromethyl groups may also be used as reactive monomers or polymerized product in the coating solutions used according to the present invention. An example of a suitable branched monomer for such purposes is a perfluorinated iso-octyl monomer having two terminal trifluoromethyl groups.

According to embodiments of the invention, the carbon chain length of the trifluoromethyl-containing monomers used to form the polymer coatings of the invention, and any functional groups used to form linkages between the fluoropolymer and the laboratory vessel, should be selected to provide an exposed surface of the coating which mainly comprises —$CF_3$ groups. The —$CF_3$ groups, which provide extremely hydrophobic properties, prevent liquids and samples contained in the vessel from infiltrating the exposed coating and reacting with the intermediate carbon groups and linkage groups of the polymerized monomer. Such infiltration is particularly prevented when the coating consists of monomers of substantially uniform length of greater than 6 carbon atoms, rather than a mixture of monomers of substantially different lengths.

According to embodiments of the invention, a polymer coating formed from a fluoroalkyl methacrylate monomer which has the chemical formula $C_7F_{15}CH_2OCOC(CH_3)$=$CH_2$ is provided. Coatings made with the polymerized product of this monomer or similar fluoroalkyl monomers having a trifluoromethyl group, have exposed coating surfaces comprising tightly packed terminal —$CF_3$ groups. The resultant coating has a low surface energy, or critical surface tension, which can be as low as about 6 dynes/cm at 20° C. depending upon the population of trifluoromethyl groups on the exposed surface and depending upon the material of the vessel which is coated. However, when a surface population of 100% by area trifluoromethyl groups is achieved, the vessel material is irrelevant to the hydrophobicity of the surface.

As the packing of terminal trifluoromethyl groups increases, the surface energy of the packed surface decreases, such that coatings having the lowest critical surface tension have the closest packed —$CF_3$ groups. The replacement of a single fluorine atom by a hydrogen atom in each terminal trifluoromethyl group of such a surface would more than double the critical surface tension, of the surface. Critical surface tensions of teflon vessels and teflon coated vessels are only as low as about 18 dynes/cm at 20° C. because such surfaces mainly comprise —$CF_2$— groups. Although it is difficult to obtain an exposed surface entirely composed of tightly packed —$CF_3$ groups, extremely low surface tensions can be achieved by the formation of exposed coating surfaces which contain 30% or more, by surface area, —$CF_3$ groups. Preferably, an exposed surface having 50% or more —$CF_3$ groups can be achieved according to the processes of the present invention. These processes tend to result in coatings having critical surface tensions ranging from about 6 dynes/cm to about 22 dynes/cm when formed on hydrophobic vessel materials.

Critical surface tensions, also referred to as surface energies, of as low as about 6 dynes/cm can be obtained according to the processes of the present invention, depending upon which terminal trifluoromethyl group-containing polymer or mixture of polymers is used to form the hydrophobic coating, the population of trifluoromethyl groups on the exposed surface, and the material of the vessel to be coated. According to embodiments of the invention wherein the exposed surface area of the hydrophobic coating material is populated with from about 50% by area to about 100% by area trifluoromethyl groups, surface energies of about 10 dynes/cm or less can be provided, particularly if the coating is formed on a polypropylene or other substantially hydrophobic laboratory vessel material, for example, a vessel material which exhibits a surface energy of 40 dynes/cm or less. Such surface energies are even lower than those of Teflon® which generally provides a surface energy of from about 18.5 to about 20 dynes/cm. Although Teflon® is formed from polymerized fully fluorinated monomers, most of the surface structure of a Teflon® coating consists of —$CF_2$— groups as opposed to closely packed terminal trifluoromethyl (—$CF_3$) groups. Even the most hydrophobic forms of Teflon®, FEP Teflon® and PFA Teflon®, which comprise mixtures of fully fluorinated polypropylene and polyethylene polymerized monomers, only provide surface energies of about 16.5 dynes/cm. As with other forms of Teflon®, the exposed surface of an FEP Teflon® coating consists mainly of —CF$_2$— groups as opposed to closely packed terminal trifluoromethyl (—CF$_3$) groups. Teflon® and FEP Teflon®, are available from DuPont Polymer Products Department, Wilmington, Del.

According to the present invention, lower surface tensions are obtained when the coating polymer comprises the polymerization product of a perfluoroalkyl monomer, when compared to coatings comprising the product of a partially non-fluorinated monomer. Substantially non-branched fluoroalkyl and perfluoroalkyl ethylenically unsaturated monomers are preferred for producing the coating polymers of the invention. According to other embodiments, a methacrylate group is used as a preferred ethylenically unsaturated monomer for making the polymeric coating material of the invention. Other monomers which can be used include silicones, epoxies and urethanes. Other reactants which may be used include anhydrides, amines, polyols, vinyls, vinyl ethers, and mixtures thereof. Polymers made from mixtures of acrylates and epoxies or of acrylates and silicones are particularly preferred according to some embodiments of the invention. Polymeric coating materials comprising urethane monomers and/or polymers are preferred for some applications wherein a durable coating is needed.

According to embodiments of the present invention, articles can be provided with a coating thereon comprised of a prepolymerized fluoroalkyl, or preferably perfluoroalkyl, ethylenically unsaturated monomer having a terminal trifluoromethyl group. More particularly, the present invention relates to such a coating which consists essentially of a polymerization product of a fluoroalkyl or perfluoroalkyl ethylenically unsaturated monomer having a terminal trifluoromethyl group and an average carbon atom chain length of from 3 to about 20 atoms, more preferably from about 6 to about 14 atoms, and optionally a durable resinous component such as a urethane or polyurethane component.

According to a preferred embodiment of the present invention, prepolymerized terminal trifluoromethyl-containing monomers having a uniform pendant group length of from 8 to 10 carbon atoms and substantially free of branching can be deposited on laboratory vessels to form coatings with low surface energies and critical surface tensions of about 10 dynes/cm or less. The coatings also exhibit exceptional resistance to many solvents with the exception of substantially fluorinated solvents. Coating solutions containing polymers of such monomers produce a highly ordered, densely packed polymer with a predominantly trifluoromethyl surface.

Solutions of polymers made from monomers having terminal trifluoromethyl groups are commercially available. One solution which can be used to form polymeric hydrophobic coatings according to the invention is available from The 3M Company as FC-722. Other trifluoromethyl group-containing polymer solutions in fluorosolvents are available from Cytonix Corporation of Beltsville, Md. as the PerFluoroCoat and FluoroPel products lines. The coating solutions used according to embodiments of the present invention comprise fluoropolymers having terminal trifluoromethyl groups. The solutions can be used full strength but may be diluted with a fluorosolvent to form low concentrations of coating polymer. The polymer solution used to make the coatings of the invention preferably have a coating polymer content of from about 0.01% by weight to about 50% by weight.

Methods of making fluoropolymer coating solutions or suspensions for use with the invention comprise prepolymerizing a fluoroalkyl ethylenically unsaturated monomer having a terminal trifluoromethyl group to form a polyfluoroalkyl polymer, and dissolving or suspending the polymer in a fluorinated solvent. When making such solutions, the fluoroalkyl ethylenically unsaturated monomer preferably has a carbon chain length of from about 3 to about to 20 carbon atoms, with carbon chain lengths of from about 6 to about 12 atoms being more preferred. Carbon chain lengths of from 8 to 10 atoms are particularly preferred. Mixtures of different fluoroalkyl ethylenically unsaturated monomers having different carbon chain lengths may be employed, however, when the polymerized monomers have essentially uniform carbon chain lengths, hydrophobic coatings of extremely low and repeatable surface tension can be provided.

According to embodiments of the invention, hydrophobic coatings are provided which may preferably comprise, and more preferably consist essentially of, a polymerization product of a substantially non-branched perfluoroalkyl monomer. Coatings according to the invention may comprise polymerized products of monomers having terminal trifluoromethyl groups, including fluorinated or perfluorinated monomers such as hexyl ethylenically unsaturated monomers, heptyl ethylenically unsaturated monomers, octyl ethylenically unsaturated monomers, nonyl ethylenically unsaturated monomers, decyl ethylenically unsaturated monomers, undecyl ethylenically unsaturated monomers, and dodecyl ethylenically unsaturated monomers. Mixtures of two or more different monomers may also be used and are preferred when it is desired to adjust surface energy properties to precise values.

The coatings of the present invention may comprise or consist essentially of a polymerization product of a fluoroalkyl ethylenically unsaturated monomer having a terminal trifluoromethyl group and a carbon chain length of from 3 to 20 atoms, preferably from 6 to 12 carbon atoms in length, and more preferably from 8 to 10 carbon atoms in length. In particular, polymerization products of fluoroalkyl methacrylates are preferred. According to some embodiments of the invention, polymerization products of perfluorohexyl methacrylate, perfluoroheptyl methacrylate, perfluorooctyl methacrylate, perfluorononyl perfluorodecyl methacrylate, perfluoroundecyl methacrylate or perfluorododecyl methacrylate, and mixtures thereof, are preferred. Acrylates of such perfluoroalkyls are also preferred. According to one particularly preferred embodiment, the polymer coating consists essentially of a polymerization product of perfluorooctyl methacrylate.

Exemplary materials for making the coatings of the present invention include PerFluoroCoat and FluoroPel, both available from Cytonix Corporation, the fluorinated materials FC-722, FX-13, FX-14, FX-189, L-9187, L-9186, Fluorel™ FC2174 and Fluorel™ FC 2181, all available from Commercial Chemicals Division/3M, St. Paul, Minn., silastic fluorosilicone rubbers from Dow Corning STI identified as LS-2249U, LS-2332U, LS-2840 and LS-2860, and fluorinated materials from DuPont including materials traded under the name ZONYL.

The solvent for the coating solutions used according to the invention may comprise a fully fluorinated non-branched fluorocarbon having a carbon chain length of 7 or 8 carbon atoms. Such a solvent exhibits a boiling point of about 80° C. Perfluorinated fluorocarbon solvents are preferred according to some embodiments of the invention.

According to embodiments of the invention, preferred fluorinated solvents include the Fluorinert® line of fluorinated solvents, FC-71, FC-75, FC-40, FC-70, FC-77 and FC-84, all from the 3M Company. Other fluorinated solvents which may be used include Vertrel® XF ($C_5H_2F_{10}$) or Freon TF from DuPont, Wilmington, Del., the fluorinated polyethers HT70, HT85, HT90, HT100, HT110, HT135, HT200, HT230, HT250 and HT270, and the perfluorinated polyethers sold as GALDEN, all from Ausimont USA, Inc. The Ausimont USA, Inc. solvent designations indicate the boiling point of each solvent. Higher boiling solvents, for example, HT270 and HT250, would form coatings requiring more heat to dry than coatings made with the lower boiling solvents, for example, HT70. The lower boiling Ausimont USA, Inc. solvents more rapidly evaporate when compared to the higher boiling solvents.

Other fluorocarbon solvents may be used and typically have boiling ranges of from about 30° C. to about 250° C., depending upon a number of factors including the length of the carbon chain. At least partially fluorinated solvents are preferred, particularly those fluorocarbon solvents having at least about 20% by weight fluorine atoms per molecule. Solvents exhibiting surface energies of 18 dynes/cm or lower are preferred, with solvents having surface energies of 13 dynes/cm or lower being more preferred and those having 9 dynes/cm being even more preferred. In preferred embodiments of the methods of the present invention, the solvent is substantially recovered after a coating procedure. Volatile fluorinated surfactants may be included in the coating formulations of the present invention.

Additives may be incorporated into or polymerized with the coating polymers and monomers used to provide coatings according to the invention having improved toughness, chemical resistance, hardness, softness, processability, elasticity, adhesion, color, texture, thickness and/or uv-resistance. Hydrophobic additives are preferred. Chemically resistant additives are preferred. Additives including non-trifluoromethyl-containing reactants and/or monomers may be added in amounts ranging from 1 to about 95% by weight and are described in more detail below.

According to an embodiment of the present invention, extremely hydrophobic surfaces on a variety of articles not limited to laboratory vessels can be formed. The compositions of the present invention are useful for any article which is intended to be exposed to elements, that is, exposed to the environment, exposed to precipitation, unprotected, unsheltered. The compositions of the present invention provide surfaces that are preferably weatherable, rust resistant, corrosion resistant, able to maintain the appearance of a surface, able to withstand contact with precipitation without degradation, chemically resistant and mechanically resilient. Compositions are provided that combine relatively soft polymers of unbranched trifluoromethyl-containing monomers, and tough, chemically resistant non-fluorinated resins such as acrylics, cellulosics, epoxy, polyesters, silicones, urethanes, anhydrides, amines, polyols, vinyls, vinyl ethers, and combinations thereof. These mixtures may produce surfaces that are rich in trifluoromethyl groups and interior compositions that are substantially non-fluorinated.

The coating compositions for articles not limited to laboratory vessels, according to the present invention, can include functionalized fluoropolymers that have cross-linkable chemical groups, for example, Lumiflon® FE3000, FE4100, FE4200, FE4400, LF100, LF200, LF302, LF400, LF600X, LF710N, LF800, LF910LM, and LF916N, from Asahi Glass Co., Tokyo, Japan. The coating compositions of the present invention can include fluorourethanes, for example, those available from Century 2000 Coatings, Alexandria, Va., and those disclosed in U.S. Pat. No. 4,132,681 to Field, which is herein incorporated in its entirety by reference. Particularly preferred are fluorourethanes comprising polymers of polyisocyanates and fluorine-containing diols, resulting in good chemical and mechanical properties. These fully or partially fluorinated resins may be used as primers for other coatings of the present invention or as mixtures with polymers and/or monomers according to the present invention.

The coating formulations for articles can produce extremely hydrophobic substantially unbranched highly populated trifluoromethyl surfaces and interior compositions that are unfluorinated, partially fluorinated or perfluorinated. The phrase "highly populated" applies to surface populations of 15% by area or greater trifluoromethyl groups.

The coating compositions for articles not limited to laboratory vessels, of the present invention, can comprise: a copolymer of at least one fluorine-containing monomer; a perfluoropolymer; tetrafluoroethylene; perfluoro-2,2-dimethyl-1,3-dioxole (PDD); fluoroethylene-propylene; a polymer containing difluoromethylene; a functionalized fluoropolymer; the polymerization product of a branched trifluoromethyl (TFM) containing monomer; or combinations thereof.

According to some embodiments of the present invention, the coating composition for articles includes an aromatic or aliphatic polyurethane. According to some embodiments of the present invention, the coating preferably comprises the polymerization product of an isocyanate-containing monomer. Optionally, the coating can further comprise a cellulosic; a polyester; the polymerization product of an unsaturated monomer; a condensation polymer; a silicone polymer; an epoxy; or combinations thereof.

The present invention also provides a coated formed rough surface for articles not limited to laboratory vessels. The coating comprises at least one fluorinated component including a fluorinated monomer or a polymerization product thereof. The fluorinated monomer has from about 3 to about 40 fluorine atoms and at least one trifluoromethyl group. The formed rough surface has features smaller than about 100 microns. The coated surface provides a surface area populated with 30% by area or more trifluoromethyl groups and a surface energy of about 22 dynes/cm or lower. The formed rough surface can comprise a pattern of features.

According to some embodiments of the invention, hydrophobic coatings are made of a polymerization product of a fluorinated monomer having a terminal trifluoromethyl group, and further containing small amounts of co-monomers, for example, silanes, that serve to promote adhesion to metal, glass or ceramic vessels without compromising the extremely low surface energy of the coating. Coupling agents may also be used as adhesion promoting monomers and include those listed in Table 1 under the heading "Coupling Agents" in the Polymer Encyclopedia. Exemplary coupling agents include vinyltrimethoxysilane, chloropropyltrimethoxysilane, 3-glycidoxypropyltrimethoxysilane, and 3-methacryloxypropyl-trimethoxysilane. Such silanes and coupling agents, if present, can be present in amounts of from 1% by weight to 10% by weight, more preferably from about 2% by weight to about 5% by weight. If co-monomer is added, the amount added is not so much as to cause the surface population of trifluoromethyl groups to be less than 30% by area.

Other adhesion promoting monomers can be added to the coating formulations of the invention. If used, adhesion promoting monomers other than silanes are preferably added in amounts of from about 1% by weight to about 40% by weight, more preferably from about 5% by weight to about 20% by weight, based on the weight of the polymerization product making up the coating material. Adhesion promoting monomers which may be used include alkoxy terminated monomers and methacrylate esters and acrylate esters listed as adhesion promoting monomers on page 16 of the 1994 Sartomer Product Catalog, including mono-, di- and trifunctional acrylate or methacrylate ester monomers.

Other additives which may be incorporated or polymerized with the terminal trifluoromethyl-containing monomers or products of the inventive coatings include high glass transition temperature (high $T_g$) perfluorinated or non-perfluorinated monomers, and low $T_g$ perfluorinated or non-perfluorinated monomers. High $T_g$ monomers can be included to form hard hydrophobic coatings for laboratory vessels, which are highly resistant to solvent removal and retention of biological sample. Preferably, the coating composition comprises a fluoropolymer having a $T_g$ of greater than 100° C., more preferably, greater than 140° C. The hard coatings are harder than similar coatings which differ only in that they do not incorporate the high $T_g$ component. High $T_g$ monomers which may be employed include those fluorochemical acrylate or methacrylate monomers which form homopolymers exhibiting $T_g$'s of 50° C. or higher. Exemplary additives of this category are available from the 3M Company as FX-14 (homopolymer $T_g$=60° C.), L-9187 (homopolymer $T_g$=60° C.), and L-11913 (homopolymer $T_g$=116°0 C.). Of the exemplary monomers denoted above, L-11913 is a preferred monomer, and has the formula: cyclo-$C_6F_{11}CH_2OCOC(CH_3)$=$CH_2$. If L-11913 is incorporated, it is preferably employed in an amount of from about 1% by weight to about 60% by weight, based on the weight of the coating.

Low $T_g$ monomers can be included to form soft, hydrophobic coatings for laboratory, vessels, which are highly resistant to solvent removal and retention of biological sample. The soft coatings are softer than similar coatings which differ only in that they do not incorporate the low $T_g$ component. Low $T_g$ additive monomers can be used to form hydrophobic pressure sensitive adhesive coatings, which find many uses including the ability to adhere to covering materials such as Teflon tape or high $T_g$ coatings of the present invention, even underwater. Low $T_g$ monomers which may be employed include fluorochemical acrylate or methacrylate monomers which form homopolymers having $T_g$'s of about 5° C. or lower, preferably about 0° C. or lower. More preferred low $T_g$ monomers have terminal trifluoromethyl groups. Exemplary additives of this category are available from the 3M Company as FX-189 (homopolymer $T_g$=3° C.), L-9186 (homopolymer $T_g$=0° C.), L-9911 (homopolymer $T_g$=-53° C.), L-12044 (homopolymer $T_g$=-23° C.), L-12043 (homopolymer $T_g$=-5° C.), and L-9367 (homopolymer $T_g$=-120° C.). Of the foregoing monomers, L-9186 is a preferred monomer and has the formula: $C_7F_{15}CH_2OCOCH$=$CH_2$. Combinations of different low $T_g$ and high $T_g$ monomers may be added to the coating formulations of the present invention to provide the coating with a specific hardness or pressure sensitive adhesiveness.

Other additives which may be added to the coating solutions of the invention include perfluorinated and non-perfluorinated plasticizers. Plasticizers can be added in amounts of from about 1% by weight to about 30% by weight, more preferably 5% by weight to about 10% by weight, based on the weight of the coating. Exemplary plasticizers include high boiling point Fluorinert solvents from the 3M Company including FC-71, and high boiling point perfluorinated polyethers available from Ausimont USA, Inc., including HT270.

Cross-linkable monomers may be incorporated into the coating solutions, suspensions and formulations according to embodiments of the present invention. Cross-linkable monomers may preferably be used for some applications in amounts ranging from about 1% by weight to about 95% by weight, preferably from about 5% by weight to about 70% by weight, and even more preferably from about 10% by weight to about 20% by weight. Cross-linkable monomers which may be incorporated include epoxies such as novolac epoxies, bisphenol A epoxies, acrylates, silicones, urethanes, anhydrides, and silicates.

Reactive non-fluorinated monomers and resins can also be added to the coating formulations of the invention to provide different properties to the coatings. According to embodiments of the invention, reactive monomers and resins such as methacrylate monomers, silicone monomers, epoxy monomers, urethane monomers and oximes can be included in the coating formulations.

According to embodiments of the invention, coating formulations are provided comprising epoxy monomer or resin in amounts of from about 20% by weight to about 95% by weight, based on the total weight of the coating formulation. Preferably, from about 30% by weight to about 70% by weight epoxy monomer may be included in a curable coating formulation. Epoxy resins may be used including the EPON Resins from Shell Chemical Company, Houston, Tex., for example, EPON Resins 1001F, 1002F, 1007F and 1009F, as well as the 2000 series powdered EPON Resins, for example, EPON Resins 2002, 2003, 2004 and 2005. Preferably, the epoxy monomer or resin has a high crosslink density, a functionality of about 3 or greater, and an epoxy equivalent weight of less than 250. Exemplary epoxies which may be employed according to embodiments of the invention include The Dow Chemical Company (Midland, Mich.) epoxy novolac resins D.E.N. 431, D.E.N. 438 and D.E.N. 439.

If an epoxy is included in the coating formulation, a curing agent for the epoxy may be added in amounts of from about 1% by weight to about 10% by weight of the epoxy component. The curing agent may be a catalyst or a reactant, for example, the reactant dicyandiamide. From about 1% by weight to about 50% by weight epoxy solvent, based on the weight of the coating formulation, may also be included in the coating formulations. Epoxy solvents can be added to liquify the epoxy monomer or resin or adjust the viscosity thereof. Preferred epoxy solvents are triethylphosphate and ethylene glycol. A separate epoxy solvent may not be needed according to some embodiments of the invention wherein the epoxy is liquid at room temperature or wherein a fluorinated monomer or surfactant component of the coating formulation acts as a solvent for the epoxy.

Even when a large amount of non-fluorinated epoxy is included in a coating formulation according to the invention, surface populations of trifluoromethyl groups of about 30% by area or more can nonetheless be achieved on the coating. Prepolymerized trifluoromethyl-containing monomers and/or reactive trifluoromethyl -containing monomers in the coating formulation tend to migrate to the surface of the coating during heat curing of the epoxy. The trifluoromethyl-containing components are mobile during epoxy curing due to thermal forces, convective forces, evaporative forces and diffusion forces. If included in a formulation, volatile trifluoromethyl-containing monomer is mostly driven off during heat curing of the epoxy, but can be polymerized into the coating in the presence of peroxide or azo compound catalysts, initiators or promoters.

According to some embodiments of the invention, the coating formulation comprises an aqueous suspension of the trifluoromethyl-containing component such as ZONYL NWA, from DuPont. Suspension formulations according to the invention, may further include additives as discussed above, including epoxy resins. Exemplary waterborne epoxy resins which may be used in aqueous suspension coating formulations according to the invention include the EPI-REZ Resins from Shell Chemical Company, for example, the EPI-REZ Resins WD-510, WD-511, WD-512,3510-W-60,3515-W-60,3519-W-50,3520-WY-55 and 3522-W-60. The coating composition may comprise microparficles, microfibers, foaming and/or pore-forming agents, and may be dried, cured, and/or hardened so as to produce sufficient surface roughness to provide high contact angles to water.

According to some embodiments of the invention, a coating solution or suspension is provided which comprises prepolymerized fluorinated monomer, reactive non-polymerized fluorinated monomer, and an additional additive, for example, at least one of the additives discussed above. The additional additive may be added in substantial amounts, for example, up to 95% by weight, provided the resultant coating has a surface population of trifluoromethyl groups which is about 30% by area or more. Preferably, coating techniques which involve application of a solution containing unreacted monomer further include a step of recovering unreacted monomer after coating.

According to some embodiments of the invention, an operational surface of a laboratory vessel is at least partially coated with trifluoromethyl-containing monomers and non-trifluoromethyl-containing monomers followed by polymerization of the monomers and removal and recovery of unreacted monomers. According to some embodiments, the monomers are applied from a coating solution which further includes a fluorinated solvent. Preferably, when reactive fluorinated monomers are used to coat an operational surface, and subsequently polymerized, unreacted monomer is removed and substantially recovered after coating and curing.

According to some embodiments of the invention, the coating solution comprises the polymerization product of substantially terminal trifluoromethyl-containing monomers, and unreacted terminal trifluoromethyl-containing monomers. After coating an operational surface, the coating is then subsequently polymerized to form polymer from the unreacted monomer in the coating solution. Such a procedure results in extremely hydrophobic coatings. When partially unreacted coating solutions are used, they may also include from about 15% by weight to about 95% by weight, based on the weight of the coating, of non-perfluorinated functional monomer, such as an epoxy.

Linkage mechanisms for binding the trifluoromethyl-containing monomer or polymer of the present coating formulations to an operational surface of a vessel include functional linkage groups such as peroxide catalyzed linkages, azo catalyzed linkages, free radical induced linkages, cationically induced linkages, radiation induced linkages, vinyl linkages, methacrylate linkages, urethane linkages, epoxy linkages, condensation linkages, silane linkages, and siloxane linkages.

According to embodiments of the invention, prepolymerized hydrophobic coatings according to the invention comprise a polymerization product of a substantially trifluoromethyl-containing monomer, that is, having at least about 15%, preferably 30%, of the terminal groups of the reactant monomer or monomers comprising trifluoromethyl groups, and from about 1% by weight to about 10% by weight of additional comonomers. The additional comonomers having functionality that is polymerizable by a second, different mechanism than the mechanism used to polymerize the substantially trifluoromethyl-containing monomer. The second polymerization mechanism may be activated during or following application of the hydrophobic coating to an operational surface, allowing the hydrophobic coating to become crosslinked with itself or with the vessel walls. For example, the initial polymerization may be carried out as an addition reaction of acrylates or methacrylates using a free radical catalyst, whereas the second polymerization may be carried out as a cationic reaction of epoxides using a cationic or acid catalyst. An exemplary material having epoxy functionality and acryl ate functionality is glycidyl-methacrylate. Peroxides will attach hydrocarbon groups to hydrocarbons on the surface of the vessel.

According to some embodiments of the invention, low surface energies can be obtained when a terminal trifluoromethyl-containing monomer is coated onto the operational surface of a vessel and subsequently polymerized after coating. Substantially non-branched fluoroalkyl and perfluoroalkyl ethylenically unsaturated monomers are preferred according to embodiments of the invention. According to some embodiments, a methacrylate group is used as the preferred ethylenically unsaturated monomer. Other monomers which can be used include fluorinated or perfluorinated silicones, epoxies, urethanes and oximes. Polymers made from mixtures of acrylates, urethanes and epoxies are particularly preferred. According to some embodiments, both prepolymerized fluorinated monomer and reactive non-polymerized fluorinated monomer are used in the coating formulation, and after application to an operational surface, the reactive monomer is then polymerized or volatilized. Preferably, the reactive monomer is polymerized.

Another method of forming a coating according to embodiments of the invention is by using monomers capable of free radical linkages. Such monomers can be attached to vessel surfaces if the vessel surfaces are first treated by ionizing radiation or other means to generate free radicals across the surface. A monomer capable of free radical linkages can be formed by mixing a fluoroalkyl ethylenically unsaturated monomer dissolved in a suitable fluorocarbon solvent with an effective amount of a free radical initiator. Vessels coated with the mixture are then heated to the temperature at which the free radical initiator initiates free radical generation. Many conventional azo compounds have an appropriate activation temperature, particularly within the range of 30-200° C. Many azo compounds may be used which are activated by visible or ultraviolet light.

According to some embodiments of the invention, when working with liquids which only slightly wet fluorinated surfaces, for example, when the contact angle between the liquid and the surface is greater than b 90°, it may be desirable to provide a rough surface coating on a laboratory vessel to more effectively prevent runoff of the liquid as might occur from a smooth hydrophobic coating. Such would be the objective when it is desired to maintain a drop of liquid sample on a microscope slide. A microscopically roughened or porous hydrophobic surface which will not be wetted can be made according to the present invention by adding microscopic particles of a surface roughening agent, for example, a micropowder, to the hydrophobic coating material or to the surface to which the coating polymer is to be applied. According to embodiments of the invention, microscopic particles can be added to coating formulations of the present invention which comprise (1) a polymerization product of a trifluoromethyl-containing monomer, (2) an unreacted trifluoromethyl-containing monomer, or both (1) and (2). Microscopic particles can also be added to coating formulations which further include a fluorinated solvent.

While many microparticles may be used as surface roughening agents according to the present invention, micropowders are a preferred class of surface roughening agents. Micropowders are defined herein as those powders or particles having average diameters of from submicron sizes up to 100 microns. A preferred micropowder average diameter is about 10 microns or less. Hydrophobic materials are particularly preferred for the micropowders. Suitable micropowders include silicon glass particles with and without silane coatings, pigments, Teflon® powders, flour, cornstarch, siliconized glass, fluorosiliconized inorganic pigments, and micronized cellulosics. According to embodiments of the invention, a composite surface is formed by adding a substantially uniformly sized micropowder to a fluoropolymer or a fluoromonomer which is to be subsequently coated and then polymerized. The use of micropowders exhibiting wide particle size distributions also provides preferred coatings according to some embodiments of the present invention.

Inert micropowders are preferred, particularly for applications where the resultant coating is exposed to liquids which are other than aqueous in nature. One particularly preferred micropowder is a siliconized glass particulate material having a 0.3 micron average particle size diameter available as TULLANOX HM 250 or TULLANOX HM 250D, from Tulco, Inc., Ayer, Mass. Another preferred micropowder is Teflon® MP 1200, available from DuPont Polymer Products Department, Wilmington, Del., and having an average particle diameter of about 4 µm.

Microfibers are another class of surface roughening agents and may be used in the coating compositions of the present invention. Inert microfibers are preferred according to some embodiments of the invention, for example, some embodiments requiring mechanical strength A preferred microfiber is a cellulose microfiber having an average diameter of about 4 microns and an average length of about 40 microns, for example, TECHNOCELL 40™ available from EastTec, of Pennsylvania Microfibers of longer lengths are also preferred.

The methods of the present invention may comprise diluting a trifluoromethyl-containing coating polymer solution or suspension prior to applying the solution or suspension to an operational surface of a laboratory vessel. The coating solution or suspension is preferably diluted to between about 0.01 and 2 percent by weight coating polymer. Higher weight percentages of the polymer may be used although higher concentrations tend to clog small orifices such as the opening at the end of a pipette tip for a volumetric pipettor, or small orifices such as nozzles and nozzle openings in ink jet printer print heads.

One preferred method for applying a coating polymer solution or suspension comprises dip-coating a laboratory vessel or other articles into a polymer solution or suspension. Other coating methods may also be used, including spray coating, tumbling in solution, brush coating, padding, spraying, fogging, transferring, painting, printing, stenciling, screen printing, pad printing, ink jet printing, injection molding, laminating and doctoring. For articles having interior walls defining a reservoir portion, the area of the article around and defining an opening to the reservoir is preferably also coated. For simultaneously coating a large number of small articles, each having a reservoir portion, a tumbling method of coating is preferred.

Dip coating may be used according to some embodiments of the invention to apply the coating polymer from a solution of the polymer dissolved in a fluorosolvent or from a suspension of the polymer. After coating the polymer solution, the coating is allowed to dry and solvent or carrier is driven off.

After forming a first coating of polymer according to the invention, the methods of the invention may also comprise applying at least one other coating formulation comprising a polymer having terminal trifluoromethyl groups. According to some embodiments of the invention, one or more coatings of the same or different terminal trifluoromethyl-containing polymers may be applied, depending upon the desired surface energy properties of an operational surface being coated.

According to some embodiments of the invention, the coating formulation is not a polymer solution or suspension but instead comprises a fluidized micropowder of the polymerization product of entirely or substantially trifluoromethyl-containing monomers. The micropowder formulation can be applied to at least a portion of an article surface, for example, an operational surface of a laboratory vessel, and melted to form a hydrophobic coating having an extremely low surface energy, a high resistance to solvent removal, and for laboratory vessels, a low retention of biological samples. According to some embodiments, the coating formulation comprises a fluidized micropowder of the polymerization product of entirely or substantially trifluoromethyl-containing monomers, and at least one substantially non-perfluorinated resin. The micropowder and resin are applied to a surface, for example, an operational surface of a laboratory vessel and heated to melt the fluidized micropowder.

According to embodiments of the invention, the coating polymer or coating monomer formulation of the invention is applied as a micropowder along with at least one of a curable resin and a non-curable resin. Preferably, the at least one resin is substantially non-perfluorinated. Curable resins which can be used in formulations of micropowder coating material include epoxy resins, urethane resins, acrylate resins, methacrylate resins. Highly cross-linked resins provide excellent solvent resistance according to embodiments of the invention. An exemplary resin having a high crosslink density is the epoxy novolac resin D.E.N. 439, available from Dow Chemical Co., Midland, Mich.

According to other embodiments, resins with low crosslink densities may be employed for coatings subsequently used with aqueous mediums. An exemplary low crosslink density resin is the fusion solid EPON Resin 1004F available from Shell Chemical Company, Houston, Tex. EPON Resin 1004F is a bisphenol A epoxy resin having a melting point of about 100° C. Other EPON Resins from Shell Chemical Company may also be used, including 1001F, 1002F, 1007F and 1009F, as well as the 2000 series powdered EPON Resins, for example, EPON Resins 2002, 2003, 2004 and 2005.

Non-curable resins which may be employed include powdered ethyl cellulose, powdered polyethylene, powdered polypropylene and powdered polyvinylidene difluoride. Cellulose acetate butyrate pellets also be jet milled and applied as a powder. Cellulose acetate butyrate is typically non-curable but can be cross-linked with peroxides.

The substantially non-perfluorinated resin is preferably non-fluorinated according to some embodiments of the invention.

The micropowders and resins used according to embodiments of the invention can be formed, for example, by jet milling. The micropowders and resins are preferably particles having an average diameter of about 50 microns or less, with average diameters of 10 microns or less being more preferred. The powders can be electrostatically sprayed onto a surface with or without a curing agent.

Micropowders according to the present invention may also be prepared as latexes in aqueous suspensions, subsequently separated from the liquid phase, and dried. Nanopowders and micropowders with substantially trifluoromethyl surfaces may be prepared in radio frequency and microwave plasmas of trifluoromethyl-containing gases.

In another embodiment of the invention, the coating is formed from a fluidized micropowder product of trifluoromethyl-containing monomer and substantially non-perfluorinated resin, wherein the micropowder is applied and melted on an operational surface.

In another embodiment of the invention, a fluidized micropowder of a non-perfluorinated resin is coated with the polymerization product of a substantially trifluoromethyl-containing monomer. The powder is subsequently melted to form a hydrophobic coating.

In another embodiment of the invention, a surface is coated with a coating formulation comprising a fluidized micropowder of a polymerization product of substantially trifluoromethyl-containing monomer, and a hydrophobic non-melting micropowder that does not melt at temperatures required for formation of the coating. The formulation is then heated or sintered to melt the fluidized polymerization product micropowder without melting the non-melting micropowder. The non-melting micropowder is preferably selected from the group consisting of Teflon micropowders, Tefzel™ micropowders, Kynar™ micropowders, polyvinylidene difluoride micropowders, and polypropylene micropowders.

According to embodiments of the invention which involve forming coatings by melting micropowders, the coating formulations may be applied as a suspension to the operational surface and subsequently dried prior to melting.

Another method of forming laboratory vessels having hydrophobic coatings according to the present invention involves preinjecting or coinjecting a coating formulation prior to or during the laminar flow of molten materials injected into a mold or through an orifice to form articles, for example, laboratory vessels. The coating formulation comprises the prepolymerization product of a trifluoromethyl-containing monomer, preferably a product which has from about 50% to 100% of exposed terminal groups being trifluoromethyl groups. The preinjected or coinjected coating formulation may also comprise a thermoplastic resin and/or a thermosetting resin. The injectable coating formulation may comprise mixtures of trifluoromethyl-containing monomer, catalyst, and resin. The injectable coating formulation may comprise mixtures of molten prepolymerized trifluoromethyl-containing monomer and microparticles, to form coatings exhibiting extraordinarily high contact angles of 160° or more to aqueous liquids. The injectable coating formulations may comprise mixtures of molten prepolymerized entirely or essentially trifluoromethyl-containing monomers, other resins, and microparticles, which are preinjected or coinjected to or during the laminar flow of molten materials injected into a mold or through an orifice to form coatings on the resultant vessels having extraordinarily high contact angles to aqueous liquids, high resistance to solvent removal, and low retention of biological samples.

According to yet other embodiments of the invention, a tubular laboratory vessel such as a microcentrifuge tube or test tube is provided and comprises a tubular body having an interior sidewall and a closed lower end having an interior surface. A hydrophobic coating according to the invention is applied to the interior sidewall but not to the interior surface of the closed lower end, or the interior closed end is substantially free of the coating. An aqueous sample placed in the tubular body tends to be retained at the closed lower end of the vessel and tends not to creep or advance onto the coated interior sidewall, even during movement of the vessel.

Other applications of the coating compositions of the present invention include their use on ink-jet ink print heads to form hydrophobic surfaces surrounding inkjet nozzle orifices. Hydrophobic properties in such regions of an ink jet print head are particularly beneficial in the use of organic solvent based inkjet inks which have even a greater tendency to wet-out on the print head than do aqueous based ink jet inks. The hydrophobic nature of such a print head design prevents nozzle clogging and cross-contamination between individual orifices of the print head. The entire print head surface containing the inkjet nozzle orifices can be coated with the hydrophobic coating composition of the present invention or only in areas surrounding the individual orifices. The compositions for such uses can may or may not contain a hardenable material along with the trifluoromethyl-containing component.

In yet another embodiment of the present invention, it has been discovered that certain composite coatings can be rendered substantially resistant to water film formation and loss of performance due to ultraviolet light degradation by including in the composite coating a hydrophobic liquid that is mobile, even as a component of a coated composition. Preferably, the mobile component remains mobile throughout the period of intended use of the coating. Herein, the term "mobile" refers to a component of a coating composition or coated composition that can migrate or move through the composition to become present at a surface of a coating made from the composition. The mobile component is preferably a substantially or fully non-volatile fluorinated compound. Preferably, the mobile component is a non-volatile fluorinated liquid that remains liquid at at least one temperature within the range of from about −30° C. to about 30° C. Preferably, coating compositions according to this embodiment of the present invention contain the mobile fluorinated liquid, in an amount sufficient to improve the hydrophobicity and/or the lifespan of the hydrophobic nature of the coating. Preferably, the mobile fluorinated liquid is present in the coating composition in an amount of from about 0.001 to about 20 percent by weight based on the total non-volatile components weight of the coating composition, more preferably from about 2 to about 10 percent by weight.

According to embodiments of the present invention, a composition of matter is provided that includes a hardenable resin, hydrophobic microparticles having an average particle size diameter of from about 1 nanometer to about 100 microns, and a substantially nonvolatile mobile fluorinated compound that is a liquid at at least one temperature in the range of from about −30° C. to about 30° C. Preferably, the fluorinated compound is a perfluorinated compound, for example, a perfluoroether. Fluoro-chloro compounds are also preferred. The fluorinated compound is preferably resistant to degradation by sunlight. Preferably, the fluorinated compound produces a surface comprising at least fifteen percent trifluoromethyl groups.

According to preferred embodiments of the invention, the melting point of the mobile fluorinated compound is below about 30° C., and the compound is preferably liquid at below about 20° C. Preferably, the melting point of the fluorinated compound is below about 30° C. More preferably, the fluorinated compound is substantially nonvolatile at or below 30° C.

According to embodiments of the invention, the coating composition has a volume of hardenable resin that is less than the volume of hydrophobic microparticles in the composition. The microparticles preferably comprise a polytetrafluoroethylene material, a polytetrafluoroethylene copolymer, or combinations thereof. The microparticles may also be composed of organic and/or inorganic substances having a hydrophobic coating that is preferably weather and uv resistant. The microparticles may be porous or may comprise clusters of smaller particles. The hydrophobic microparticles may have an average particle size diameter of from about 1 micron to about 100 microns. The composition, in place of or in addition to the hydrophobic microparticles, may include or comprise nanoparticles having an average particle size diameter of less than about 100 nanometers. Preferably, the coating composition includes both microparticles and nanoparticles, for example, up to about 30% by weight nanoparticles based on the weight of the microparticles, preferably up to about 10%by weight nanoparticles, such as from about 5% by weight to about 10% by weight nanoparticles. Nanoparticles smaller than 30 nanometers are preferred. The hydrophobic microparticles may be clusters of nanoparticles.

Preferably, the composition further comprises a volatile solvent. The volatile solvent may be at least partially fluorinated, and can be perfluorinated. The volatile solvent may contain hydrogen, chlorine, methoxy groups, ethoxy groups, or other halogens.

The hardenable resin of the composition is preferably hardenable by radiation, by moisture, by oxidation, by the addition of a hardener or co-resin, by heat, or by evaporation of a solvent. The hardenable resin preferably has a functionality of at least two, for example, a functionality of at least three.

The hardenable resin may be at least one resin of an acrylate, an alkyd, a urethane, an isocyanate, an epoxy, a fluorocarbon, a silicone, a siloxane, a silicate, a ceramic, a metal, a polyester, a vinyl, an anhydride, a polyimide, a polyol, or a combination thereof. Preferably, the hardenable resin includes or comprises polyhexamethylene diisocyanate, methylene bis hexane isocyanate, and/or an ethoxylated acrylic. The hardenable resin is preferably weather resistant.

Coating compositions are also provided according to the present invention that do not necessarily include a mobile fluorinated component but which do include a hardenable resin, hydrophobic microparticles having an average particle size diameter of from about 1 micron to about 100 microns, and/or hydrophobic nanoparticles having an average particle size diameter of less than about 100 nanometers. Preferably, in such compositions, the nanoparticles have an average particle size diameter of less than about 20 nanometers. The microparticles may be made of polytetrafluoroethylene, a polytetrafluoroethylene copolymer, or a combination thereof. The microparticles may be coated with a hydrophobic coating, such as a silane or fluorosilane. Such compositions may also include a volatile solvent, for example, an at least partially fluorinated volatile solvent. The hardenable resin preferably is of the type described above with reference to the coating compositions containing a mobile fluorinated component.

According to an embodiment of the present invention, a composition of matter is provided that includes a volume of hardenable resin, and a volume of hydrophobic nanoparticles having an average particle size diameter of less than about 100 nanometers, wherein the volume of the hydrophobic nanoparticles is equal to or greater than the volume of the hardenable resin. Preferably, the volume of the nanoparticles is more than twice the volume of the hardenable resin. The nanoparticles preferably have an average particle size diameter of less than about 20 nanometers.

Articles having a coating on a surface thereof are also provided according to the present invention, wherein the coating is a coating as described herein. The present coatings are particularly useful on articles that in use are exposed to weather or the elements. The present coatings are particularly useful on articles that in use are intended to reflect or conduct electromagnetic radiation. Articles that benefit from the coatings of the present invention may also include laboratory vessels or components thereof.

The present invention also relates to processes of improving a coating, which processes include applying to the coating a fluorocarbon film or layer onto and conforming to at least the interstitial surfaces of the coating. The fluorocarbon film or layer may preferably include a hardenable resin and a volume excess of hydrophobic particles. The film or layer may have a thickness of less than about 2 microns, or a thickness of less than about half of the average interstitial pore size diameter of the interstitial pores of the coating. The film may have a thickness of less than about 50 nanometers. The hydrophobic particles preferably have an average particle size diameter of less than about 100 microns. The fluorocarbon film or layer may also include a substantially nonvolatile liquid, more preferably, a mobile non-volatile fluorinated compound. The fluorocarbon film or layer may include nanoparticles having an average particle size diameter of about 100 nanometers or less. The fluorocarbon film or layer preferably comprises a copolymer of polytetrafluoroethylene. A fluorocarbon film comprising Dupont Teflon® AF or Ausimont Hyflon® AD is preferred. Fluorocarbon films comprising fluorinated dioxol polymers and copolymers are preferred.

The present invention also relates to processes of improving a surface having rough, porous, striated, embossed, particle-covered, or micropatterned features, which processes include applying to the surface a fluorocarbon film or layer onto and conforming to the surface. The features have at least one width dimension of about 100 microns or less and are spaced about 100 microns or less apart. Features that have a height greater than about half their width dimension are preferred. The features may be created using abrading, etching, machining, micromachining, photolithography, laser ablation, molding, embossing or any means that produces a microfeatured surface. The fluorocarbon film or layer may include a hardenable resin and/or a volume excess of hydrophobic particles. The film or layer may have a thickness of less than about 10 microns, or a thickness of less than about half of the average distance between the rough, striated, embossed, particle-covered, or micropatterned features of the surface. The film may have a thickness of less than about 50 nanometers. The hydrophobic particles preferably have an average particle size diameter of less than about 100 microns. The fluorocarbon film or layer may also include a substantially nonvolatile liquid, more preferably, a mobile non-volatile fluorinated compound. The fluorocarbon film or layer may include nanoparticles having an average particle size diameter of about 100 nanometers or less. The fluorocarbon film or layer preferably comprises a copolymer of polytetrafluoroethylene. A fluorocarbon film comprising Dupont Teflon® AF or Ausimont Hyflon® AD is preferred. Fluorocarbon films comprising fluorinated dioxol polymers and copolymers are preferred.

According to the present invention, it has been discovered that nonvolatile silicone oils are effective as mobile components and extend the performance of Teflon® dispersions in each of: moisture-curable polyisocyanate resin coating compositions; uv-curable ethoxylated triacrylate coating compositions; epoxy-amine coating compositions; and urethane alkyd coating compositions. Low $T_g$ polymers of diisocyanate perfluoroethers and perfluorodiols, such as Ausimont's (Morristown, N.J.) Fluorolink® B and Fluorolink® D4000, are even more effective, according to the present invention, than silicones in reducing ultra-violet (uv) degradation. Preferably, such low $T_g$ polymers have a glass transition temperature of from about −150° C. to about −100° C. Polychlorotrifluoro-oils, such as Halocarbon's H1000 oil (River Ridge, N.J.), are also effective and useful as the mobile component in accordance with the present invention. According to a more preferred embodiment of the present invention, a nonvolatile fluorinated polyether is included in a coating composition as the mobile component, such as Ausimont's Fomblin Y45 and Dupont's Krytox® GPL107. These fluorinated polyether oils remain liquids even at temperatures of about −30° C.

According to the present invention, it has been discovered that when the surface of a hydrophobic liquid resin or polymer, such as a hydrocarbon or fluorocarbon oil, is degraded and made more hydrophilic, the changed surface is rapidly drawn into the interior of the liquid and replaced with a new surface which is similar to the original surface. This process of surface energy minimization occurs until all of the liquid is degraded, which in the case of fluoropolymer oils, can be many years, or even decades. According to the present invention, a solid surface coating which includes a hydrophobic liquid resin or polymer and that has been degraded to a higher surface energy is also regenerable such that the degraded surface is drawn into the interior of the coating and replaced with a new surface when the solid is melted.

According to embodiments of the present invention, solid films of PTFE Teflon®, Teflon® AF, polyperfluorooctyl methacrylate, Cytonix Corporation's FluoroPel® 804A (Beltsville, Md.), polyethylene, hardened epoxy, and hardened epoxy coated with a 1 micron film of Ausimont Y45 oil, were tested. After exposure to the equivalent of one year in mid-latitude summer sun, the polyperfluorooctyl methacrylate surface had changed in contact angle to water from 120° to 60°. For polyethylene and hardened epoxy, the changes were from 90° to 20° and from 70° to 100°, respectively. However, the fluorocarbon oil-coated epoxy retained its contact angle of 100°. Furthermore, when the polyperfluorooctyl methacrylate and polyethylene were melted, their contact angles were restored. Virgin PTFE surfaces and Teflon® AF showed only slight changes from initial contact angles of about 115° to contact angles after exposure of about 105°.

It has also been discovered according to the present invention that during heavy rainfall, only hard, presumably water-resistant resins prevented hydrophobic particles on the surface from being washed away. It is believed that the Vellox coating permanently looses performance due to erosion of fumed silica from its alkyd resin matrix. Experiments with formulations involving 25 parts of a resin, 100 parts dispersed Dupont ZONYL MP1000 micropowder (Wilmington, Del.), 6 parts Ausimont Y45 and 900 parts volatile fluorochloro solvent have shown that hardness is a critical factor in limiting extreme heavy rain erosion. The resin to micropowder volume ratio was about one to about four. Extreme heavy rain was defined as 60 inches per hour at drop velocities of 50 miles per hour. Silicones and elastomeric urethanes eroded after a few inches of extreme heavy rain, and fluoropolymers, epoxies and acrylics with moderate hardness eroded after 10 to 20 inches. Hard epoxies, polyurethanes and acrylics with high cross-link densities were exceptionally durable, showing little erosion after 60 inches of extreme heavy rain.

A further discovery according to the present invention was that the inclusion in a coating composition of mobile fluorinated liquid according to the present invention, in an amount of from about 0.1 percent by weight to about 15 percent by weight based on the total non-volatile components weight of the coating composition, more preferably from about 4 percent by weight to about 7 percent by weight, improved the rain performance of formulations that were not exposed to uv radiation. It is believed that the mobile fluorinated liquid covers the exposed hard resin present in the interstitial spaces between hydrophobic particles, inhibiting moisture accumulation. The mobile hydrophobic liquid can also help to hold clusters of nano-sized or micro-sized particles together by hydrophobic bonding. For example, in experiments wherein Ausimont Y45 oil is added to a Boyd Teflon® dispersion coating at 6 percent of total solids, which as supplied would wet out after 5 minutes of extreme heavy rain, performance of the Boyd Teflon® coating was substantially improved for coatings exposed to the equivalent of 5 years of mid-latitude summer sunlight.

A further aspect of the invention is that the addition of extremely fine hydrophobic micropowders having average particle size diameters of from about 1 to about 100 nanometers (nm), further improves the rain performance of composite hydrophobic coatings, particularly in amounts of from about 1.0% by weight to about 30% by weight based on the total non-volatile components weight of the coating composition. Average particle sizes of from about 1 nm to about 50 nm are preferred. Average particle sizes of from about 1 nm to about 10 nm are even more preferred. For example, hard resin formulations including Dupont's ZONYL 5069, having nanoparticles with average particle size diameters in the range of from about 10 nanometers to about 100 nanometers, and added in an amount of about 10 percent by weight based on the weight of Dupont's ZONYL MP1000 in the formulation, significantly improved both heavy and extreme rain performance compared to the performance of similar formulations but containing no ZONYL 5069. Formulations replacing the larger particle sized ZONYL MP1000 completely with ZONYL 5069 showed little further improvement over the 10 percent by weight addition described above. It is believed that the small polytetrafluoroethylene (PTFE) particles decrease the surface area of exposed interstitial hardened resin, functioning in a similar way as the non-volatile hydrophobic liquid. Extremely fine hydrophobic nanoparticles may also change the interstitial pore geometry to a more conical, more water-ejecting, shape.

In yet another embodiment of the present invention, it was has been discovered that the rain performance of composite coatings comprising a hardenable resin and a volumetric excess of hydrophobic micropowder could be improved by overcoating the interstitial surfaces with a nonvolatile fluorinated liquid, a uv-resistant fluorinated film, and/or a uv-resistant fluorinated nanopowder. These results were observed after spraying, blotting, and dipping uncured composite coatings in dilute 0.01 percent by weight to 2.0 percent by weight suspensions of hydrophobic nanoparticles in a volatile solvent, or after spraying, blotting, and dipping uncured composite coatings in dilute about 0.01 percent to about 1.0 percent nonvolatile fluorinated liquids in a volatile fluorinated solvent. The rain performance of composite coatings overcoated with dilute solutions, for example, from about 0.01 percent to about 1.0 percent solutions, of Dupont Teflon® AF, 3M FK800, or Ausimont Hyflon® AD, were also substantially improved.

According to various embodiments, adhesion of the coating to a surface can be enhanced through the incorporation of an adhesion promoter compound into the coating composition. Furfural-containing alkoxylated reactive monomers can be included in the coating composition to enhance adhesion of fluorinated polymers or monomers to plastics, fibers, and other surfaces, for example, to polycarbonate surfaces. For example, propoxylated furfurylated acrylates and other alkoxylated furfurylated compounds, for example, alkoxylated tetrahydrofurfurylated compounds, can provide enhanced adhesion properties when incorporated into a fluorinated coating composition.

According to various embodiments, a fluorinated coating material is provided that includes an adhesion promoter that can include an alkoxy moiety, for example, a $C_1$ to $C_8$ straight or branched non-aromatic alkoxy moiety such as a $C_1$ to $C_5$ straight or branched nonaromatic alkoxy moiety. The alkoxy moiety can be repeated to include up to about 100 total carbon atoms or up to about 60 total carbon atoms, for example, from about three to about 30 total carbon atoms, or from about three to about six total carbon atoms. The carbon chain length can be of a length sufficient to minimize degradation due to UV exposure. According to various embodiments, the adhesion promoter can include a dipropoxylated structure, for example, a di-isopropoxylated structure.

According to various embodiments, the adhesion promoter can include an oxygen-containing ring structure present as a saturated or a non-saturated non-aromatic oxygen-containing ring including four or five carbon atoms. According to various embodiments, the adhesion promoter can include a furan-like ring, or a pyran-like ring structure. According to various embodiments, a saturated furfuryl ring structure can be present in the adhesion promoter.

According to various embodiments, the adhesion promoter can include a reactive group, for example, at least one monomeric unit selected from alcohols, amines, isocyanates, acrylates, methacrylates, epoxies, vinyls, silicones, acetates, alkyds, mercaptans, thios, phosphates, acids, esters, and combinations thereof. According to various embodiments, the reactive group can include an acrylate or a methacrylate.

According to various embodiments, the adhesion promoter can be incorporated into or polymerized with coating monomers, polymers, or both to provide coating compositions. According to various embodiments, a furfuryl-containing alkoxylated alcohol can be reacted with a polyisocyanate, such as polyhexamethylene diisocyanate, to form a polyisocyanate alkoxylated furfuryl that can be simultaneously or subsequently reacted with a fluorinated component. According to various embodiments, one equivalent of the alkoxylated furfuryl alcohol can be reacted with, for example, one, two, or three equivalents of one or more fluorinated alcohols, along with a molar equivalent of a polyhexamethylene diisocyanate having an average functionality of two, three, or four. According to various embodiments, in a reaction with an epoxy, such as novolac epoxy, one to three equivalents of an alkoxylated furfural amine and five to seven equivalents of a fluorinated amine can be reacted with the epoxy to produce a coating composition.

According to various embodiments, coatings can be made from the reaction product of a fluorinated monomer, an adhesion promoter, and a suitable co-monomer, for example a polyisocyanate, an epoxy, an amine, an acrylate, a urethane, a siloxane, a combination thereof, or the like. The fluorinated monomer can include from about one to about 100 carbon atoms, for example, from about three to about 20 carbon atoms. The carbon-carbon bonds of the fluorinated monomer can be saturated or unsaturated. The fluorinated monomer can include a straight or branched carbon chain. The fluorinated monomer can be perfluorinated. According to various embodiments, the fluorinated monomer can include a trifluoro group, a difluoro group, a difluorochloro group, a difluorobromo group, a difluorohalo group, a monofluoro group, a monofluorodichloro group, a monofluorodibromo group, and/or a monofluorodihalo group. The fluorinated monomer can include a trifluoromethyl group. According to various embodiments, the reaction of the various components can be catalyzed by a suitable catalyst, for example, reactions or siloxanes and/or silanes can be catalyzed by a tin catalyst such as dibutyl tin dilaurate, or a platinum catalyst such as platinum tetrachloride.

According to various embodiments, the coating composition can include a sufficient amount of adhesion promoter to improve the adhesion of a fluorinated composition to a surface. The coating composition can include from about 0.01 to about 50 percent by weight, from about 0.1 to about 40 percent by weight, or from about 2.0 to about 30 percent by weight of an alkoxylated furfurylated compound.

According to various embodiments, the coating composition can include one or more fluorinated components. The one or more fluorinated components can include a fluorinated compound, for example, an alcohol, an amine, an isocyanate, an acrylate, a methacrylate, an epoxy, a vinyl, a silicone, an acetate, an alkyd, a mercaptan, a thio, a phosphate, an acid, an ester, a combination thereof, or the like. According to various embodiments, the fluorinated component can include at least one terminal trifluoromethyl group. According to various embodiments, the fluorinated component can include a trifluoro group, a difluoro group, a difluorochloro group, a difluorobromo group, a difluorohalo group, a monofluoro group, a monofluorodichloro group, a monofluorodibromo group, and/or a monofluorodihalo group. The coating composition can provide a coating including an exposed surface area populated with more than about 15 percent by area trifluoromethyl groups and, for example, sufficient to provide a surface energy of about 22 dynes/cm or lower at 20° C.

The coating can be applied to a variety of surfaces such as polytetrafluoroethylene surfaces, polypropylene surfaces, other polymeric surfaces, glass surfaces, metal surfaces, wood surfaces, and the like. The coating composition can be coated onto a polycarbonate or a polyvinylchloride surface.

According to various embodiments, a kit is provided that can include, separately or in any combination thereof, the adhesion promoter, a fluorinated component, and optionally a co-monomer, crosslinker, catalyst, initiator, promoter, combinations thereof, or the like.

According to various embodiments, the coating composition can contain two components or the reaction product of the two components, wherein the two components include an alkoxylated tetrahydrofurfuryl acrylate, and a fluorinated monomer. The alkoxylated tetrahydrofurfuryl acrylate can be a propoxylated tetrahydrofurfuryl acrylate, for example, CD611 available from Sartomer Company, Inc. of Exton, Pa.

According to various embodiments, a method of coating a surface using the kit is provided. The method can involve combining all the components of the kit and then coating the surface with combined formulation. Alternatively, the method can involve pr-coating a surface to be coated with one or more of the above described kit components, and subsequently coating the pre-coated surface with one or more of the remaining components. The method can include hardening or curing one or more components or component mixtures with heat, moisture, or UV radiation, or by drying, the one or more components or component mixtures before, or after, coating the one or more components or component mixtures onto a surface.

The present invention is exemplified with reference to the following Examples. In the Examples below, the surface energies of the coatings was determined as follows. A series of hydrocarbon oils with known surface tensions were used to develop a graph of liquid surface tensions verse the cosines of the liquid contact angles for each oil. The interpolated intercept of the graphed line at a cosine of one indicates the surface energy of the coating.

EXAMPLE 1

A plurality of polypropylene pipette tips were enclosed in a monofilament polyester mesh bag and the bag was placed in a tumbling or agitating device. The mesh bag permitted treatment of the pipette tips by allowing coating solution to pass through the bag and substantially wet the surfaces of the pipette tip, including surfaces at and around the tip openings. The tumbling device was fitted with special gaskets to render the machine interior air-tight and fluid-tight. To the machine interior was also added a sufficient amount of coating solution to at least partially immerse the bag of pipette tips. The coating solution comprised a diluted solution of a fluorocarbon polymer having terminal trifluoromethyl groups. The fluorocarbon polymer solution is available as FluoroPel from Cytonix Corporation. The FluoroPel solution provides the polymer completely dissolved in a fully fluorinated solvent of perfluorinated fluorocarbons having an average carbon chain length of from about 7 to about 8 carbon atoms. The solvent exhibited a boiling point of from about 90° C. to about 100° C. Additional perfluorinated solvent or similar perfluorinated fluorocarbon solvent was added as a diluent to the FluoroPel solution to provide a coating solution having a solids content, or a non-volatile components content, of coating polymer of about 0.5% by weight.

The tumbling device was equipped with a blower for removing volatile solvent from the coating and interior airspace, and with a heater for heating air to be blown by the blower. The tumbling device was run to agitate and tumble the pipette tips and the coating solution, thus evenly distributing the coating solution on the surfaces of the tips and sufficiently wetting the surfaces of the tips, including surfaces at or around the tip openings. The interior of the device was maintained at or below room temperature during solution coating of the tips. After a few minutes of tumbling, a drain in the interior of the device was opened to allow excess coating solution to drain out from the tumbling device interior during further tumbling. After a few minutes of draining with continued tumbling, the blower and heater were turned on and air having a temperature of about 80° C. was blown through the device interior, and exhausted. The heated air evaporated solvent from the coated solution and from the interior airspace of the tumbling device. The bag of pipette tips continued to tumble during the drying process. The drained and evaporated solution and solvent was collected, reconcentrated and recycled. The coating polymer was not volatile under exposure to the 80° C. air.

The coated and dried pipette tips were removed from the device interior and mesh bag. Both exterior and interior surfaces of the tips were coated by the process. The coated surfaces had a resultant surface energy of less than about 10 dynes/cm and an estimated surface population of trifluoromethyl groups of about 50% by area or more.

EXAMPLE 2

A highly chemically and solvent resistant hydrophobic coating for a microscope slide was prepared. The coating was provided from a coating formulation having the following ingredients:

50 parts by weight high functionality novolac epoxy resin, available as D.E.N. 439 from The Dow Chemical Company, Midland, Mich., having an epoxy functionality of 3.9, an epoxy equivalent weight of about 220, and a high cross-link density;

8% by weight dicyandiamide as a reactant agent for curing the epoxy, based on the weight of the epoxy;

50 parts by weight calcinated pigment;

10 parts by weight epoxy solvent triethylphosphate to liquify and reduce the viscosity of the epoxy;

10 parts by weight trifluoromethyl-containing polymer, comprising PerFluoroCoat (PFC) 468MP (a solution of polymerized and non-polymerized perfluoroalkyl monomers) available from Cytonix Corporation; and 1 part by weight 3-glycidoxypropyltrimethoxysilane.

The coating formulation was mixed, screen printed on a microscope slide, heat cured and allowed to dry. The resultant cured and dried coating exhibited a contact angle to water of 120°, was very hard, could not be scratched with a #8H pencil, and was chemically resistant to removal in a plurality of common lab solvents including acetone, water, chloroform, trichloroethane and trifluoroethane, at 20° C. The coating exhibited a very low surface energy, and the population of trifluoromethyl groups on the exposed surface of the coating exceeded 80% by area as determined by surface energy analysis.

EXAMPLE 3

A composite hydrophobic coating was prepared and provides a rough surface upon curing. The coating can exhibit extremely high contact angles to water. The coating was prepared as follows:

50 parts by weight D.E.N. 438 epoxy, 70 parts by weight triethylphosphate, 4 parts by weight dicyandiamide, and 1 part by weight 3-glycidoxypropyltrimethoxysilane were thoroughly mixed together. Then, 50 parts by weight $TiO_2$ having an average particle size diameter of about 1 μm was added and the mixture was again mixed thoroughly. Then, 100 parts by weight Teflon® MP 1200 powder was added and the mixture was again mixed thoroughly. Then, 100 parts by weight Teflon® MP 1200 powder was added and the mixture was again mixed thoroughly. Then, 10 parts by weight PFC 468MP was added and the mixture was again mixed thoroughly. The resulting formulation was applied to an operational surface of a laboratory vessel and allowed to cure for 3 minutes at 200° C.

EXAMPLE 4

A composite hydrophobic coating was prepared and provides a rough surface upon curing. The coating can exhibit extremely high contact angles to water. The coating was prepared as follows:

90 parts by weight Shell 1004-QX-55 (bis-A epoxy in xylene and propylene glycol monoethyl ether acetate), 1 part by weight imidizol (optional), 40 parts by weight ethylene glycol, and 10 parts by weight organic pigment were thoroughly mixed together. Then, 10 parts by weight Tullanox glass micropowder was added and the mixture was again mixed thoroughly. Then, 10 parts by weight PFC 468TF (solution of perfluoroalkyl polymer in Freon TF), available from Cytonix Corporation, was added and the mixture was again mixed thoroughly. The resulting formulation was applied to an operational surface of a laboratory vessel and allowed to dry at room temperature for 24 hours.

EXAMPLE 5

A highly chemical and solvent resistant hydrophobic coating for spraying or dipping was prepared. The coating was provided from a coating formulation having the following ingredients:

Part A
5 parts Futurathane 660 part A (Futura Coatings, Inc.-USA)
5 parts acetophenone (Aldrich Chemical)
20 parts Vertrel MCA Part B
5 parts Vertrel MCA (Dupont)
10 parts Asakalin 225 (Asahi Glass)
0.5 part 9187 polymer (Cytonix)
1.5 arts 9187 monomer (3M)
15 arts Futurathane 660 part B (Futura Coatings, Inc.-USA)

Parts A and B were mixed and sprayed onto glass, plastic and metal articles and allowed to dry and cure under ambient conditions for 72 hours. The resultant coatings were scratch resistant to a #6 pencil, had a contact angle to water of 120°, and were not altered by acetone, toluene or chloroethane. The population of trifluoromethyl groups at the surface exceed 80 percent.

EXAMPLE 6

A highly chemical and solvent resistant hydrophobic coating for spraying or dipping was prepared. The coating was provided from a coating formulation having the following ingredients:

Part A
5 parts Futurathane 660 part A (Futura Coatings, Inc.-USA)
5 parts acetophenone (Aldrich Chemical)
20 parts Vertrel MCA
24 parts Zonyl 1300 micropowder (Dupont)

Part B
33 parts Vertrel MCA (Dupont)
10 parts Asakalin 225 (Asahi Glass)
0.5 parts 9187 polymer (Cytonix)
1.5 parts 9187 monomer (3M)
15 parts Futurathane 660 part B (Futura Coatings, Inc.-USA)

Parts A and B were mixed and sprayed onto glass, plastic and metal articles and allowed to dry and cure under ambient conditions for 72 hours. The resultant coatings had a contact angle to water of 150°, and were not altered by acetone, toluene or chloroethane. The population of trifluoromethyl groups at the surface exceeded 80 percent.

EXAMPLE 7

A highly hydrophobic coating composition for spraying or dipping was prepared. A coating was provided from the coating formulation which had the following ingredients:
100 parts Asakalin 225 (Asahi Glass)
5 parts 9187 polymer (Cytonix)
25 parts 9187 monomer (3M)
100 parts HelmsMan Spar Urethane (Minwax, Upper Saddle River, N.J.)

Ingredients were mixed and sprayed onto glass, plastic and metal articles and allowed to dry and cure under ambient conditions for 24 hours. The resultant coatings were scratch resistant to a #2 pencil and had a contact angle to water of 120°.

EXAMPLE 8

A highly hydrophobic coating for spraying or dipping was prepared the coating was provided from a coating formulation having the following ingredients:
200 parts Asakalin 225 (Asahi Glass)
5 parts 9187 polymer (Cytonix)
25 parts 9187 monomer (3M)
120 parts Zonyl 1300 micropowder
100 parts HelmsMan Spar Urethane (Minwax, Upper Saddle River, N.J.)

Ingredients were mixed and sprayed onto glass, plastic and metal articles and allowed to dry and cure under ambient conditions for 24 hours. The resultant coatings had a contact angle to water of 150°.

EXAMPLE 9

A highly hydrophobic coating for spraying or dipping was prepared. The coating was provided from a coating formulation having the following ingredients:
200 parts Asakalin 225 (Asahi Glass)
5 parts 9187 polymer (Cytonix)
25 parts 9187 monomer (3M)
80 parts TechnoCel® 40 (available from Cellulose Filler Factory, Chestertown, Md.)
100 parts HelmsMan Spar Urethane (available from Minwax, Upper Saddle River, N.J.)

The ingredients were mixed and sprayed onto glass, plastic and metal articles and allowed to dry and cure under ambient conditions for 24 hours. The resultant coatings had a contact angle to water of 150°.

EXAMPLE 10

A highly hydrophobic coating for printing or painting was prepared. The coating was provided from a coating formulation having the following ingredients:
100 parts by weight N68 from Norland
10 parts by weight Asakalin 225 from Asahi Glass
10 parts by weight Zonyl TA-N from DuPont The ingredients were mixed and painted onto glass, plastic and metal articles and cured in mid-day summer sunlight in Virginia for one hour. The resulting coatings had a contact angle to water of 120°. The surface area population of trifluoromethyl groups exceeded 70%.

EXAMPLE 11

A highly hydrophobic coating for spraying or dipping was prepared. The coating was provided from a coating formulation having a perfluorinated hardenable resin. The coating formulation had the following ingredients:
10 parts by weight Teflon AF 1600 from DuPont
100 parts by weight FC-40 from 3M
1 part by weight L-9187 polymer from Cytonix Corporation The ingredients were mixed and heated to 120° C. for two hours. The resultant material was then painted onto glass, PTFE and metal articles and cured in an oven at 200° C. for one hour. The resulting coatings had a contact angle to water of 120°. The surface area population of trifluoromethyl groups exceeded 90%. The surface energy of the coating was below 9 dynes/cm compared to the surface energy of articles coated with Teflon AF alone, which was about 16 dynes/cm. The properties of the inventive coating indicate a substantially perfluorooctyl surface on the coatings of the present invention.

EXAMPLES 12-14

Examples 12-14 illustrate exemplary coating compositions according to the present invention which contain a non-volatile fluorinated mobile compound that is liquid at at least one temperature within the range of from about −30° C. to about 0° C.

EXAMPLE 12

Air-Curable Urethane Alkyd Coating

An air-curable urethane alkyd coating material was made as follows:

100 parts by weight Zony® MP1000 (Dupont, Wilmington, Del.) and six parts by weight Fomblin® Y45 (Ausimont USA, Inc., Morristown, N.J.) were dispersed thoroughly in 900 parts by weight room temperature Asahiklin AK-225 (Asahi Glass Co., Tokyo, Japan). Then 38 parts by weight MinWax® Helmsman Spar Urethane (The Thompson-MinWax Company, Upper Saddle River, N.J.) was blended thoroughly with the resulting dispersion to form a coating material.

EXAMPLE 13

UV-Curable Acrylic Coating

A uv-curable acrylic coating material was made as follows:

100 parts by weight Zony® MP1000 (Dupont, Wilmington, Del.) and six parts by weight Fomblin® Y45 (Ausimont USA, Inc., Morristown, N.J.) were dispersed thoroughly in 900 parts by weight room temperature Asahiklin AK-225 (Asahi Glass Co., Tokyo, Japan).

Then, 25 parts by weight SR 454 ethoxylated triacrylate (Sartomer Company, Exton, Pa.) and one part KTO46 UV-catalyst (Sartomer company, Exton, Pa.) were blended thoroughly with the resulting dispersion to form a coating material.

EXAMPLE 14

Moisture-Curable Acrylic Coating

A moisture curable acrylic coating material was made as follows: 100 parts by weight Zonyl® MP1000 (Dupont, Wilmington, Del.) and six parts by weight Fomblin® Y45 (Ausimont USA, Inc., Morristown, N.J.) were dispersed thoroughly in 900 parts by weight room temperature Asahiklin AK-225 (Asahi Glass Co., Tokyo, Japan). Then 25 parts by weight Sigma-Aldrich 41,801-3 polyhexamethylene diisocyanate (Sigma-Aldrich, Milwaukee, Wis.) and one part by weight Sigma-Aldrich 29, 123-4 dibutyl tin dilaurate (Sigma-Aldrich, Milwaukee, Wis.) were blended thoroughly with the resulting dispersion to form a coating material.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A composition comprising:
   at least one adhesion promoter compound, the at least one adhesion promoter compound comprising an alkoxy moiety, a carbon- and oxygen-containing non-aromatic ring structure, and a reactive group; and
   at least one fluorinated component, the at least one fluorinated component including from about one to about 100 carbon atoms.

2. The composition of claim 1, wherein the oxygen-containing ring structure comprises a furfuryl-containing ring structure.

3. The composition of claim 1, wherein the oxygen-containing ring structure comprises a pyran-containing ring structure.

4. The composition of claim 1, wherein the alkoxy moiety comprises a $C_1$ to $C_8$ straight or branched non-aromatic alkoxy moiety.

5. The composition of claim 1, wherein the alkoxy moiety comprises a $C_1$ to $C_5$ straight or branched non-aromatic alkoxy moiety.

6. The composition of claim 1, wherein the alkoxy moiety comprises from about one to about 60 total carbon atoms.

7. The composition of claim 1, wherein the alkoxy moiety comprises from about three to about 30 total carbon atoms.

8. The composition of claim 1, wherein the alkoxy moiety comprises from about three to about six total carbon atoms.

9. The composition of claim 1, wherein the alkoxy moiety comprises a dipropoxylated structure.

10. The composition of claim 1, wherein the alkoxy moiety comprises a di-isopropoxylated structure.

11. The composition of claim 1, wherein the at least one fluorinated component comprises at least one of a trifluoro group, a difluoro group, a difluorochloro group, a difluorobromo group, a difluorohalo group, a monofluoro group, a monofluorodichloro group, a monofluorodibromo group, and a monofluorodihalo group.

12. The composition of claim 11, wherein the at least one fluorinated component comprises at least one trifluoromethyl group.

13. The composition of claim 1, wherein the reactive group comprises at least one of an alcohol, an amine, an isocyanate, an acrylate, a methacrylate, an epoxy, a vinyl, a silicone, a silane, an acetate, an alkyd, a mercaptan, a thio, a phosphate, an acid, an ester, and a combination thereof.

14. The composition of claim 1, wherein the at least one adhesion promoter comprises a propoxylated furfurylated monomer.

15. The composition of claim 14, wherein the propoxylated furfurylated monomer comprises a reactive group, and the reactive group comprises one or more of an alcohol, an amine, an isocyanate, an acrylate, a methacrylate, an epoxy, a vinyl, a silicone, an acetate, an alkyd, a mercaptan, a thio, a phosphate, an acid, an ester, and a combination thereof.

16. The composition of claim 15, wherein the propoxylated furfurylated monomer comprises at least one of an acrylate and a methacrylate.

17. The composition of claim 1, wherein the at least one fluorinated component comprises a fluoroalkyl group.

18. The composition of claim 1, wherein the fluorinated component comprises at least one of an alcohol, an amine, an isocyanate, an acrylate, a methacrylate, an epoxy, a vinyl, a silicone, a silane, an acetate, an alkyd, a mercaptan, a thio, a phosphate, an acid, an ester, and a combination thereof.

19. The composition of claim 1, wherein the at least one adhesion promoter is present in an amount of from about 0.1 percent by weight to about forty percent by weight based on the total weight of the composition.

20. The composition of claim 19, wherein the fluorinated component includes at least one trifluoromethyl group.

21. The composition of claim 1, further comprising a fluorinated solvent.

22. A composition comprising the reaction product of at least one fluorinated component and at least one propoxylated furfurylated component, the at least one fluorinated component including from about one to about 100 carbon atoms.

23. The composition of claim 22, wherein the at least one fluorinated component comprises a fluoroalkyl group.

24. The composition of claim 22, wherein the fluorinated component comprises at least one of an alcohol, an amine, an isocyanate, an acrylate, a methacrylate, an epoxy, a vinyl, a silicone, a silane, an acetate, an alkyd, a mercaptan, a thio, a phosphate, an acid, an ester, and a combination thereof.

25. The composition of claim 22, wherein the propoxylated furfurylated component comprises at least one of an alcohol, an amine, an isocyanate, an acrylate, a methacrylate, an epoxy, a vinyl, a silicone, a silane, an acetate, an alkyd, a mercaptan, a thio, a phosphate, an acid, an ester, and a combination thereof.

26. The composition of claim 22, wherein the propoxylated furfurylated component comprises an acrylate or a methacrylate.

27. The composition of claim 22, wherein the propoxylated furfurylated component is present in an amount of from about 0.1 percent by weight to about 40 percent by weight of based on the total weight of the composition.

28. The composition of claim 22, further comprising at least one of a filler, a pigment, a plasticizing agent, an antifungal agent, an antibacterial agent, a UV inhibitor, and a mixture thereof.

29. The composition of claim 22, further comprising a fluorinated solvent.

* * * * *